(12) United States Patent
Sato

(10) Patent No.: US 8,743,237 B2
(45) Date of Patent: Jun. 3, 2014

(54) IMAGING DEVICE, SIGNAL PROCESSING METHOD, AND PROGRAM

(75) Inventor: Yutaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 13/215,870

(22) Filed: Aug. 23, 2011

(65) Prior Publication Data

US 2012/0050564 A1 Mar. 1, 2012

(30) Foreign Application Priority Data

Aug. 27, 2010 (JP) ................................ P2010-191082

(51) Int. Cl.
*H04N 5/343* (2011.01)

(52) U.S. Cl.
USPC ....................... 348/223.1; 348/222.1; 348/362

(58) Field of Classification Search
CPC ....... H04N 5/343; H04N 9/045; H04N 5/232; H04N 5/772; H04N 5/335; H04N 5/23293; H04N 9/735; H04N 1/6086; H04N 9/73; H04N 2209/046; H04N 5/2351; H04N 5/2353; H04N 5/235; H04N 5/2352; H04N 5/2355
USPC ........................ 348/223, 1, 362, 223.1, 222.1
See application file for complete search history.

(56) References Cited

U.S. PATENT DOCUMENTS

2003/0086005 A1* 5/2003 Nakamura .................. 348/223.1
2009/0096916 A1* 4/2009 Kim ............................. 348/362

FOREIGN PATENT DOCUMENTS

| JP | 63-198495 | 8/1988 |
| JP | 11-98515 | 4/1999 |
| JP | 3483732 | 10/2003 |

* cited by examiner

*Primary Examiner* — Twyler Haskins
*Assistant Examiner* — Quang Le
(74) *Attorney, Agent, or Firm* — Frommer Lawrence & Haug LLP; William S. Frommer; Ellen Marcie Emas

(57) ABSTRACT

An imaging device includes a signal control section for receiving an input signal read-out from the imaging element in either of the interlace scheme or the progressive scheme, and for performing a different process on the input signal according to the read-out scheme to generate an output signal for a signal processing section; and a signal processing section for performing signal processing on the input signal from the signal control section and for generating an output image signal. When a read-out scheme from an imaging element is either an interlace scheme or a progressive scheme, the signal control section performs a control of generating a signal which includes the same color information to output the signal to the signal processing section.

11 Claims, 16 Drawing Sheets

FIG. 1

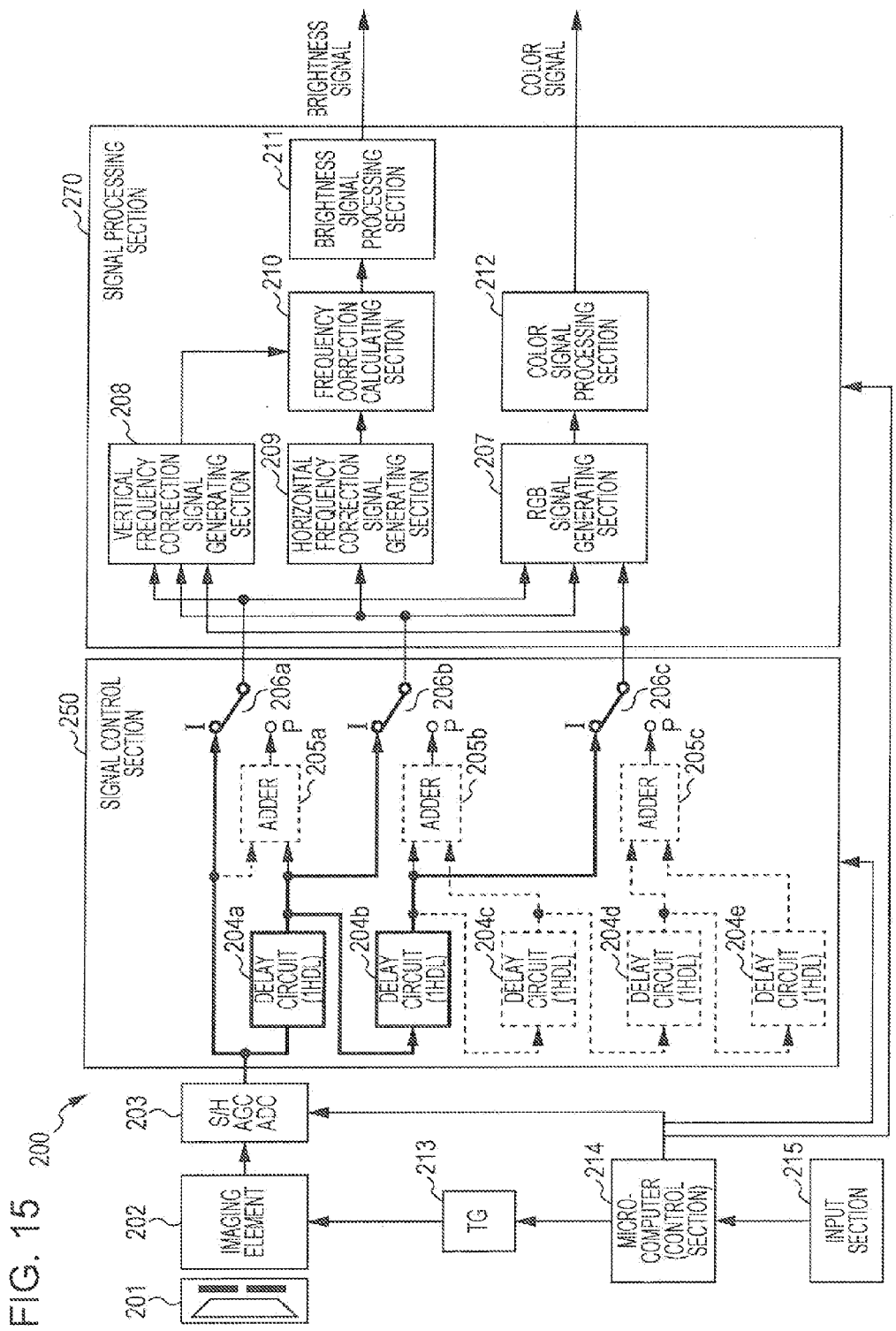

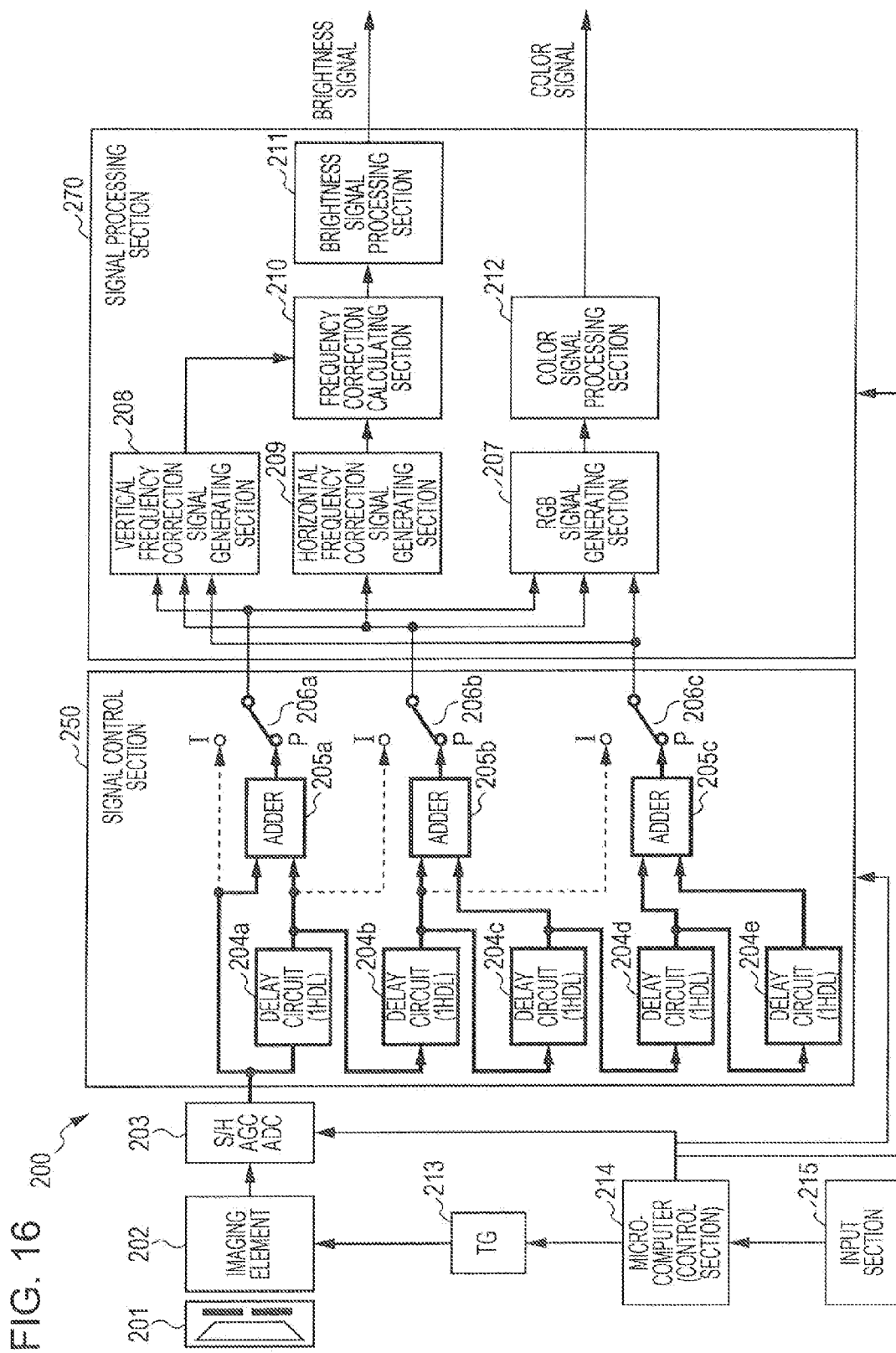

IMAGING DEVICE, SIGNAL PROCESSING METHOD, AND PROGRAM

BACKGROUND

The present disclosure relates to an imaging device, a signal processing method, and a program. In particular, the present disclosure relates to an imaging device, a signal processing method, and a program, in which a signal can be read from an imaging element by applying one of an interlaced read-out process and a progressive read-out process, and a read-out signal is processed according to each scheme.

There are various kinds of imaging elements which are used in an imaging device for capturing color images. For example, many video cameras employ an imaging element which is configured to have a filter arrangement called a complementary color checkered pattern or a color difference line sequence, in which four kinds of color filters of G (Green), Mg (Magenta), Ye (Yellow), and Cy (Cyan) are arranged in a checkered pattern.

The imaging device calculates and outputs color signals, for example, RGB, of each pixel position based on each of the complementary color signals (G, Mg, Ye, Cy) acquired in each pixel position of the imaging element. By using four kinds of complementary color filters of G (Green), Mg (Magenta), Ye (Yellow), and Cy (Cyan), a brightness signal with high sensitivity is advantageously achieved. In particular, such a complementary color filter is widely used in video cameras.

For example, in the related art, Japanese Unexamined Patent Application Publication No. 63-198495 discloses a technique in which color signals such as an RGB signal are obtained using an imaging element having the complementary color filters. In Japanese Unexamined Patent Application Publication No. 63-198495, there is disclosed a configuration that, using a 1H delay element for delaying one horizontal line, the RGB signal is obtained by calculation from both signals Cr(2R−G) and Cb(2B−G) which correspond to a signal of the current line and a signal before one line respectively, and each signal is subjected to a white balance (WB) process, and then a gamma (γ) correction process is performed, so that a color signal which is excellent in color reproducibility is obtained.

However, in such signal processing, since the four kinds of the color filters of G (Green), Mg (Magenta), Ye (Yellow), and Cy (Cyan) have deviation in color characteristic, there is a problem in that the characteristic of the calculated RGB signal varies largely. Therefore, if an additional process, for example, adjusting arithmetic equations individually against the deviation is not performed, the deviation in color reproducibility influences products. Further, in the signal processing method of the related art in which the RGB signal is calculated from both signals Cr(2R−G) and Cb(2B−G) corresponding to the current line and the line before one line respectively and then the color signals are obtained from the RGB signal, there is a problem in that aliasing occurs in a contour in which colors of an subject vary in the vertical direction.

On the other hand, as a method of reading out a signal from an imaging element, a progressive read-out scheme in which pixel data of the imaging element is read as independent signals for all pixels, and an interlaced read-out scheme in which pixels of two lines adjacent in the vertical direction are mixed and read is known. In a video camera of which the format of the output signal from the imaging element is the interlaced scheme, when a frame image in capturing a moving image is taken out as a still image, there is a problem in that blurring is perceptible in the next moving image portion as the interlaced scheme causes a difference of exposure timing of every line.

For this reason, there is proposed a configuration in which the imaging element is operated progressively to obtain an image without blurring when a still image is cut out even in the video camera of which the format of the output signal from the imaging element is the interlaced scheme. However, there is a problem in that when the progressive read-out is performed, the sensitivity is degraded further more than in the case of the interlaced operation, or the data rate at the output of the imaging element is increased such that power consumption ascends.

As a technique which discloses a signal processing method, there are, for example, Japanese Unexamined Patent Application Publication No. 11-98515 and Japanese Patent No. 3483732. In the technique, the interlaced read-out and the progressive read-out of the imaging element are configured to be switchable, and furthermore brightness/color signals are generated according to the read-out scheme. However, including these techniques, in the erstwhile related art, there is no disclosure in which the respective characteristics of the brightness signal and the color signal are approximated to each other when the interlaced read-out and the progressive read-out are switched to be used. Therefore, among images of different read-out schemes, there is a problem in that a difference between the characteristics of the brightness signal and the color signal is generated. The current state is that the problem has not been solved.

SUMMARY

The present disclosure has been made in view of, for example, the above circumstances. It is desirable to provide an imaging device, a signal processing method, and a program, in which the interlaced read-out scheme and the progressive read-out scheme can be switched, and the difference between the characteristics of the brightness signals or the color signals of an image which is obtained as a result of the signal processing on read-out signals by the different read-out schemes is removed or reduced.

According to an embodiment of the present disclosure, there is provided an imaging device including: a signal control section for receiving an input signal read-out from the imaging element in either of the interlace scheme or the progressive scheme, and for performing a different process on the input signal according to the read-out scheme to generate an output signal for a signal processing section; and a signal processing section for performing signal processing on the input signal from the signal control section and for generating an output image signal, wherein when a read-out scheme from an imaging element is either an interlace scheme or a progressive scheme, the signal control section performs a control of generating a signal which includes the same color information to output the signal to the signal processing section.

In the imaging device according to the embodiment of the present disclosure, the signal control section may include an adder for adding signals in a pixel unit between adjacent horizontal lines which are read-out signals of a progressive scheme, the signals being read-out signals of a progressive scheme. Further, the signal control section may generate a mixed signal corresponding to a 2-pixel mixed signal which is a read-out signal of an interlaced scheme by addition processing of the adder.

In the imaging device according to the embodiment of the present disclosure, the signal control section may include a plurality of delay circuits which are connected in series to delay a signal output period of one horizontal line from an imaging element. Further, the signal control section may output a plurality of different horizontal line signals, which are output from an imaging element, in parallel to the signal processing section using the delay circuits.

In the imaging device according to the embodiment of the present disclosure, the signal control section may include a switch for outputting a different control signal according to whether a read-out scheme from an imaging element is an interlaced scheme or a progressive scheme. Further, the signal control section may change settings of the switch based on a control signal of a control section according to a read-out scheme from an imaging element.

In the imaging device according to the embodiment of the present disclosure, the signal control section may include: a plurality of delay circuits which are connected in series to delay a signal output period of one horizontal line from an imaging element; an adder which adds an output of one horizontal line from an imaging element to an output of the delay circuit; an adder which adds delayed signals having different delay periods generated by the plurality of delay circuits; and a switch which selects and outputs a signal including at least any one of an undelayed signal output from the imaging element, a delayed signal which passes through only the delay circuit, and an addition signal which passes through the adder.

In the imaging device according to the embodiment of the present disclosure, when a read-out scheme from an imaging element is set to an interlaced read-out scheme in which a 2-pixel mixed signal is read out, the signal control section may output in parallel: an undelayed signal from an imaging element; a first delayed signal which is delayed by one horizontal line output period by the delay circuit; and a second delayed signal which is delayed by two horizontal line output periods generated via two delay circuits, to the signal processing section.

In the imaging device according to the embodiment of the present disclosure, when a read-out scheme from an imaging element is set to a progressive read-out scheme in which reading-out is performed on a pixel unit, the signal control section may output in parallel: a first addition signal which is generated by an adder, which adds an undelayed signal from an imaging element to a first delayed signal which is delayed by one horizontal line output period by a delay circuit; a second addition signal which is generated by an adder, which adds a second delayed signal which is delayed by two horizontal line output periods generated via two delay circuits to a third delayed signal which is delayed by three horizontal line output periods generated via three delay circuits; and a third addition signal which is generated by an adder, which adds a fourth delayed signal which is delayed by four horizontal line output periods generated via four delay circuits to a fifth delayed signal which is delayed by five horizontal line output periods generated by five delay circuits, to the signal processing section.

In the imaging device according to the embodiment of the present disclosure, the signal processing section may include: a vertical frequency correction signal generating section which receives input signals in parallel from the signal control section, the signals being output from a plurality of adjacent horizontal lines which are output from an imaging element; a horizontal frequency correction signal generating section which receives an output signal of one horizontal line or an addition signal of adjacent horizontal lines from the signal control section, the output signal being output from an imaging element; and a color signal generating section which receives output signals of a plurality of adjacent horizontal lines in parallel from the signal control section, the output signals being output from an imaging element.

In the imaging device according to the embodiment of the present disclosure, the color signal generating section may generate an RGB signal corresponding to each pixel based on an output signal of an imaging element.

In the imaging device according to the embodiment of the present disclosure, the imaging element may be an imaging element which has four kinds of color filters of G (Green), Mg (Magenta), Ye (Yellow), and Cy (Cyan).

According to another embodiment of the present disclosure, there is provided a signal processing method which is performed in an imaging device, the method including: causing a signal control section to receive an input signal read-out from the imaging element in either of the interlace scheme or the progressive scheme, and to perform a different process on the input signal according to the read-out scheme to generate an output signal for a signal processing section; and causing a signal processing section to perform signal processing on the input signal from the signal control section and to generate an output image signal, wherein in causing of the signal control section to receive the input signal and generate the output signal, when a read-out scheme from an imaging element is either an interlace scheme or a progressive scheme, the signal control section performs a control of generating a signal which includes the same color information to output the signal to the signal processing section.

According to still another embodiment of the present disclosure, there is provided a program for performing signal processing in an imaging device, the program including: causing a signal control section to receive an input signal read-out from the imaging element in either of the interlace scheme or the progressive scheme, and to perform a different process on the input signal according to the read-out scheme to generate an output signal for a signal processing section; and causing a signal processing section to perform signal processing on the input signal from the signal control section and to generate an output image signal, wherein in causing the signal control section to receive and generate a signal, when a read-out scheme from an imaging element is either an interlace scheme or a progressive scheme, the signal control section performs a control of generating a signal which includes the same color information to output the signal to the signal processing section.

Further, the program according to an embodiment of the present disclosure is, for example, a program which can be provided by a recording medium or a communication medium. The recording medium or the communication medium can provide the program in a computer readable format to an information processor, a computer, and a system through which various programs and codes are executable. By providing such a program in the computer readable format, processes corresponding to the program are realized on the information processor, the computer, and the system.

Still other ideas, characteristics, and advantages of the present disclosure will be made further more apparent by embodiments of the present disclosure described below and the accompanying drawings. Further, the system described in this specification has a configuration in which a plurality of devices is logically assembled, and these devices do not necessary to be in the same housing.

According to the configuration of an embodiment of the present disclosure, it is configured such that the signal control section performs a control of setting an output signal for the signal processing section to a signal which includes the same color information, even in either of the cases of the interlaced read-out operation and the progressive read-out operation.

Therefore, using one common signal processing section, it is possible to perform the same signal processing on the read-out signal according to two different read-out schemes of the interlaced read-out operation and the progressive read-out operation. Further, even if the read-out schemes are different, an image with the brightness signals and the color signals of the equivalent characteristics including vertical resolution can be generated and output. In other words, even though the read-out schemes are different, an image with a uniform quality can be output without generating difference in the output signals. Furthermore, through the present disclosure, advantages can be achieved such as a reduction in circuit size, power consumption, and cost.

BRIEF DESCRIPTION OF THE DRAWINGS

FIGS. 1A to 1C are diagrams illustrating a progressive read-out process and an interlaced read-out process;

FIG. 15 is a diagram illustrating an example of the flow and process of a signal when the interlaced read-out process is performed in an imaging device according to an embodiment of the present disclosure; and FIG. 16 is a diagram illustrating an example of the flow and process of a signal when the progressive read-out process is performed in the imaging device according to an embodiment of the present disclosure.

DETAILED DESCRIPTION OF EMBODIMENTS

Figure 2:
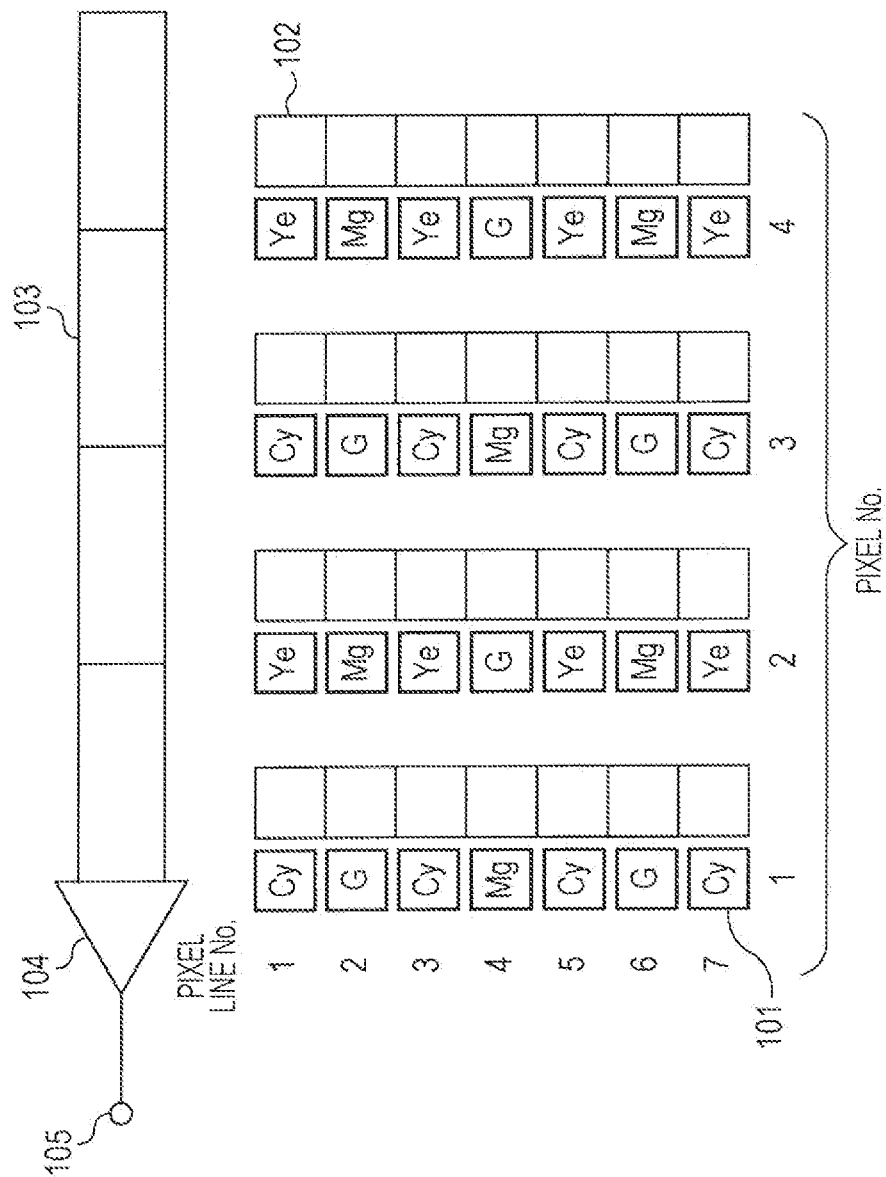
FIG. 2 is a diagram illustrating the configuration of an imaging element and a read-out process.

Hereinafter, an imaging device, a signal processing method, and a program according to an embodiment of the present disclosure will be described with reference to the drawings. The description will be done in the order as follows:

1. Outline of Signal Read-Out Process from Imaging Element
2. Exemplary Configuration of Imaging Element
3. Specific Sequences of Progressive Read-Out Process and Interlaced Read-out Process
3-1. Progressive Read-out Process
3-2. Interlaced ODD Read-out Process
3-3. Interlaced EVEN Read-out Process
4. Configuration and Processes of imaging Device
4-1. Configuration and Signal Processing of Imaging Device
4-2. Detailed Signal Processing of Interlaced Read-out Process
4-3. Detailed Signal Processing of Progressive Read-out Process 1. Outline of Signal Read-Out Process from Imaging Element First, an outline of a signal read-out process from an imaging element which is performed in an imaging device according to an embodiment of the present disclosure will be described with reference to FIGS. 1A to 1G.

The imaging device according to the embodiment of the present disclosure includes pixels of a light sensing surface of the imaging element. On each of the pixels, for example, any one of four kinds of complementary color filters of G (Green), Mg (Magenta), Ye (Yellow), and Cy (Cyan) is arranged. The imaging device calculates color signals, for example, the respective color signals of RGB, on the positions of the respective pixels based on complementary color signals which are obtained on these respective pixel positions.

The imaging device according to the embodiment of the present disclosure is configured to execute the signal read-out process from the imaging element by switching and executing the following two different read-out processes.

(a) The interlaced read-out process in which horizontal pixel lines of the imaging element are read sequentially and two lines are mixed (b) The progressive read-out process in which all of the pixels are independently read in parallel An example of a plurality of the signal read-out processes will be described with reference to FIGS. 1A to 1C.

Figure 1:
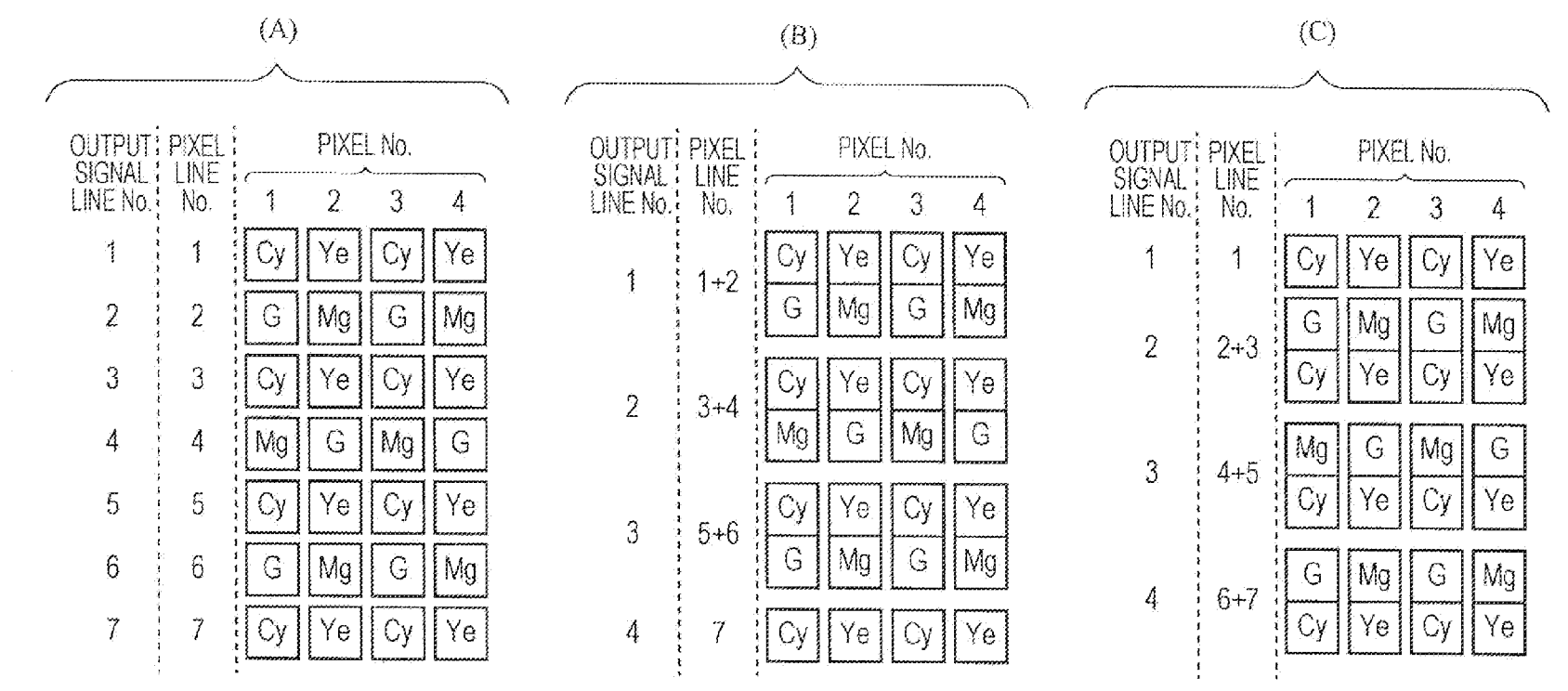

Further, in FIGS. 1A to 1C, for simple and clear description of the signal read-out process, only a part of the imaging element which is included in the imaging device is shown. Specifically, only four horizontal pixels and seven vertical pixels are extracted and shown.

FIGS. 1A to 1C show an arrangement of color filters of the imaging element in combination with the read-out process of an imaging device according to an embodiment of the present disclosure. Specifically, an example of the read-out process will be described below.

(1) An example of "the progressive read-out" process in which all the pixels are independently read.

(2) An example of the interlaced read-out in which odd-numbered lines are read in mixture with the even-numbered lines such as 1st column+2nd column, 3rd column+4th column, and 5th column+6th column, which will be described as "the interlaced ODD read-out" process below.

(3) An example of the interlaced read-out in which even-numbered lines are read in mixture with the odd-numbered lines such as 2nd column+3rd column, 4th column+5th column, and 6th column+7th column, which will be described as "the interlaced EVEN read-out" process below.

In "the progressive read-out" process shown in FIG. 1A, the pixel values of 4×7 pixels corresponding to (Pixel No. 1 to 4)×(Pixel line No. 1 to 7) shown in FIG. 1A are simultaneously read by a CCD signal transfer section, and then are output sequentially to a signal processing section.

The output signal line No. shown in the drawing denotes an order of signals which are transferred by the CCD signal transfer section. In the progressive read-out process, signal values of the respective pixels are transferred independently to the COD signal transfer section. Further, the signal transfer sequence will be described specifically in the latter part.

In "the interlaced ODD read-out" process shown in FIG. 1B, from the pixel values of 4×7 pixels corresponding to (Pixel No. 1 to 4)×(Pixel line No. 1 to 7) shown in FIG. 1B, signals which are made of the odd-numbered lines mixed with the even-numbered lines, such as 1st column+2nd column, 3rd column+4th column, and 5th column+6th column, are read by the CCD signal transfer section. Then, the COD signal transfer section transfers the mixture signals. Details of the signal transfer sequence will be described in the latter part.

Figure 10:
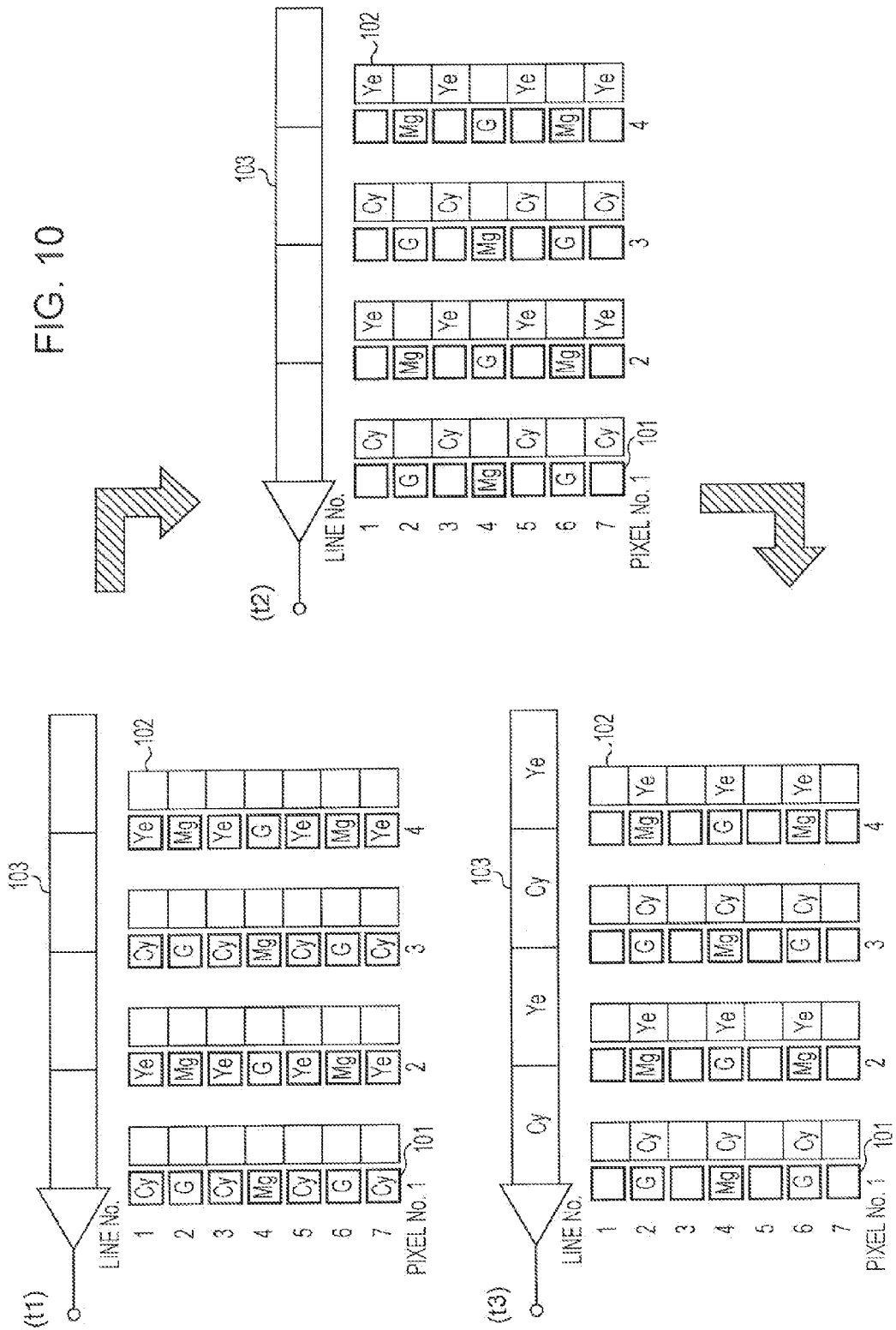
FIG. 10 is a diagram illustrating a detailed sequence of the interlaced EVEN read-out process.

In "the interlaced EVEN read-out" process shown in FIG. 10, from the pixel values of 4×7 pixels corresponding to (Pixel No. 1 to 4)×(Pixel line No. 1 to 7) shown in FIG. 1C, signals which are made of the even-numbered lines mixed with the odd-numbered lines, such as 2nd column+3rd column, 4th column+5th column, and 6th column+7th column, are read by CCD signal transfer section. Then, the CCD signal transfer section transfers the mixture signals. Details of the signal transfer sequence will be described in the latter part.

2. Exemplary Configuration of Imaging Element

FIG. 2 is a diagram illustrating an exemplary configuration of the imaging element for performing the respective read-out processes of "the progressive read-out", "the interlaced ODD read-out", and "the interlaced EVEN read-out" shown in FIGS. 1A to 1C.

Further in the imaging element shown in FIG. 2, only an area corresponding to 4×7 pixels which are a part of the imaging element included in the imaging device is illustrated.

The imaging element, as shown in FIG. 2, includes a pixel 101 for performing photoelectric conversion, a vertical CCD transfer section 102 for transferring charge in the vertical direction, a horizontal CCD transfer section 103, an output section 104, and an output terminal 105.

The vertical CCD transfer section 102 has a function of receiving charge which has been subjected to the photoelectric conversion in the pixels 101, separating and transferring charge of each pixel in the vertical direction.

The horizontal COD transfer section 103 transfers charge, which are supplied from the vertical CCD transfer section 102, in the horizontal direction. The horizontal CCD transfer section 103 has a function of separating and transferring charge which corresponds to the number of pixels in the horizontal direction.

The charge of the horizontal CCD transfer section 103 is output to the signal processing section via the output section 104 and the output terminal 105. The output section 104 converts the charge into a voltage and outputs it.

As described above, a signal which is generated based on a captured image in the pixel 101 is transferred sequentially in the order of the vertical CCD transfer section 102, the horizontal CCD transfer section 103, the output section 104, and the output terminal 105.

3. Specific Sequences of Progressive Read-Out Process and Interlaced Read-Out Process Next, the read-out sequences of "the progressive read-out" process shown in FIG. 1A, "the interlaced ODD read-out" process shown in FIG. 1B, and "the interlaced EVEN read-out" process shown in FIG. 1C will be described specifically with reference to FIG. 3 and the subsequent drawings.

The following,
(1) "the progressive read-out" process,
(2) "the interlaced ODD read-out" process, and
(3) "the interlaced EVEN read-out" process will be described with reference to FIGS. 3 to 5, FIGS. 6 to 9, and FIGS. 10 to 13, respectively.

3-1. Progressive Read-Out Process

First, the sequence of "the progressive read-out" process will be described with reference to FIGS. 3 to 5.

Figure 3:
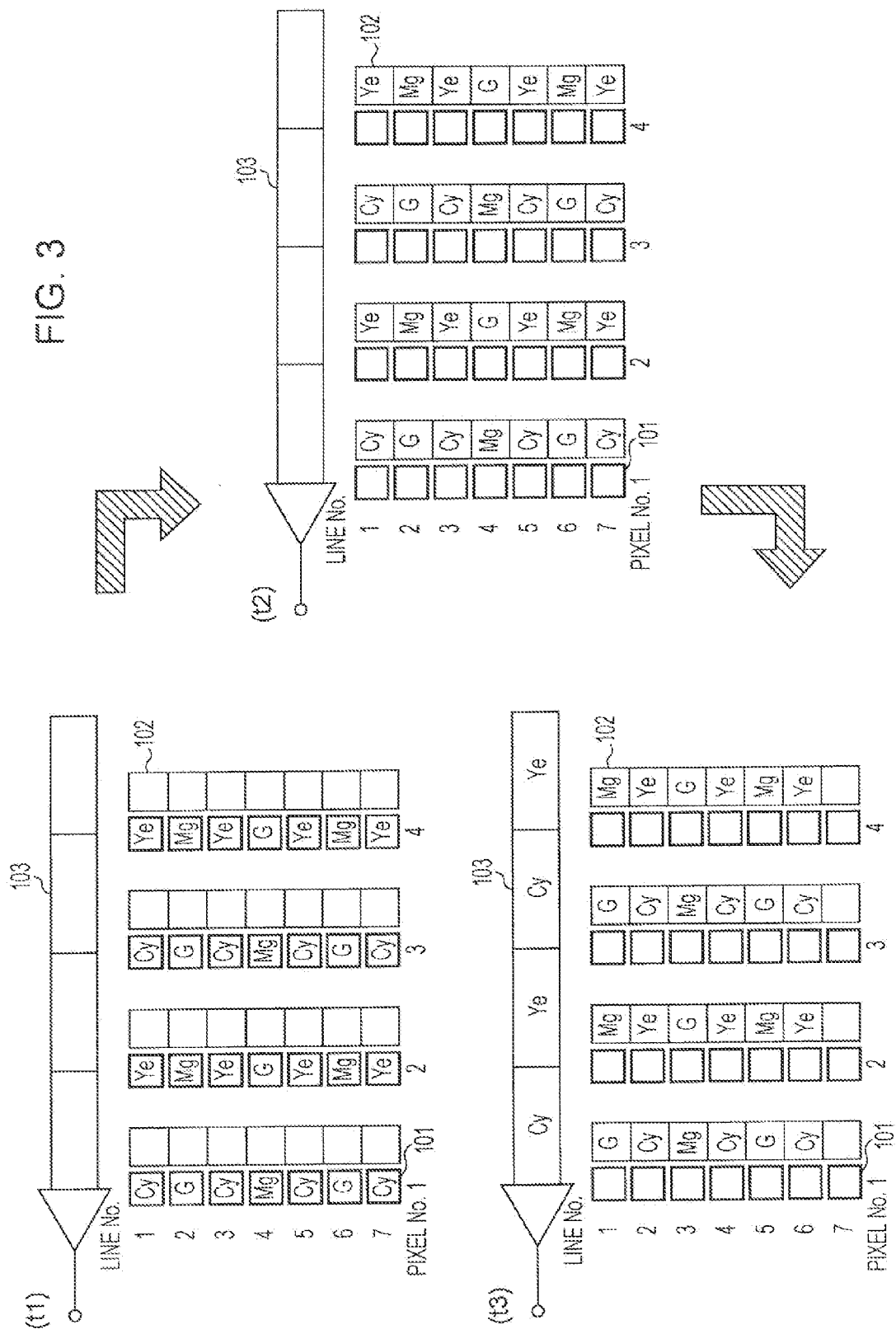
FIG. 3 is a diagram illustrating a detailed sequence of the progressive read-out process.
Figure 4:
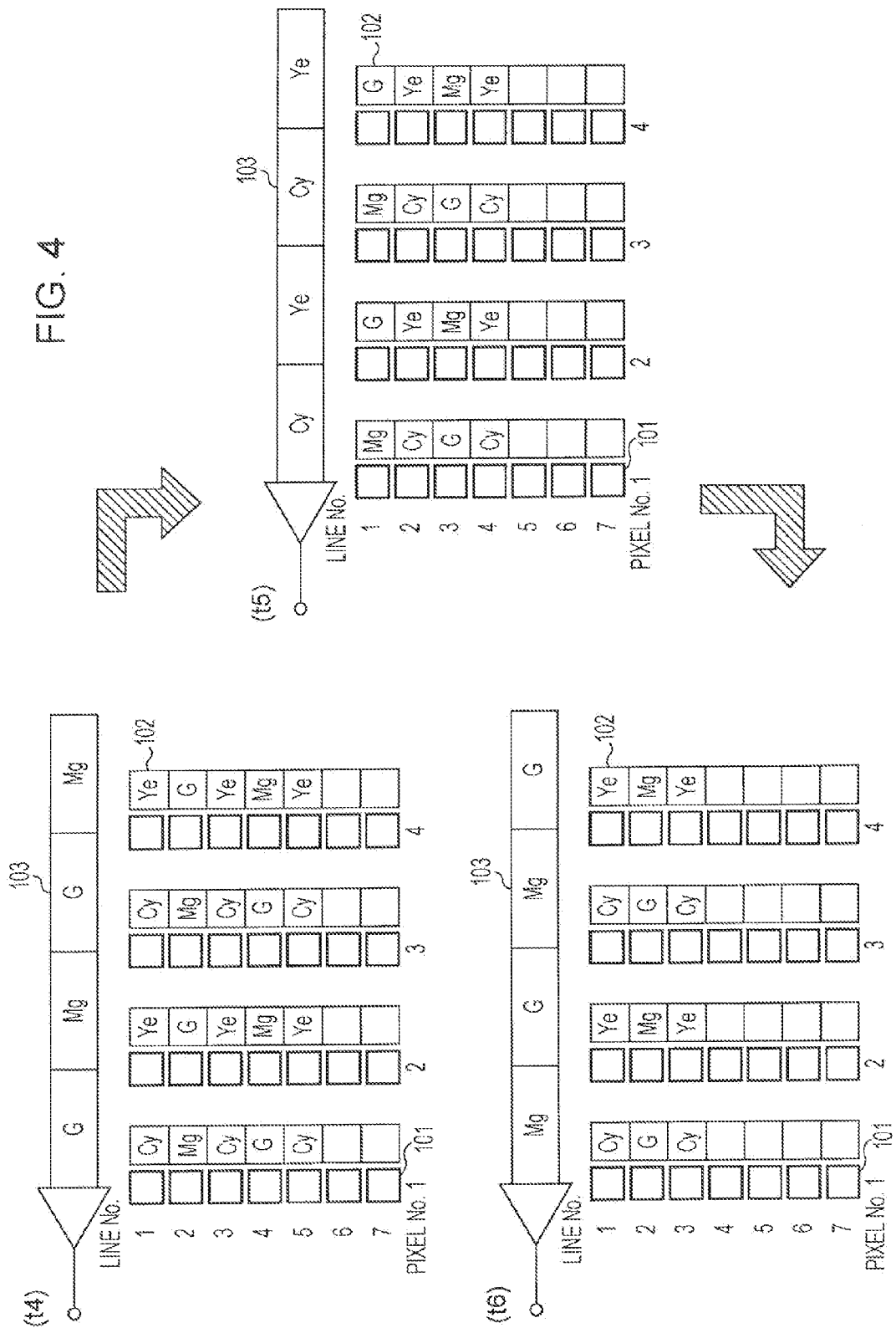
FIG. 4 is a diagram illustrating a detailed sequence of the progressive read-out process.
Figure 5:
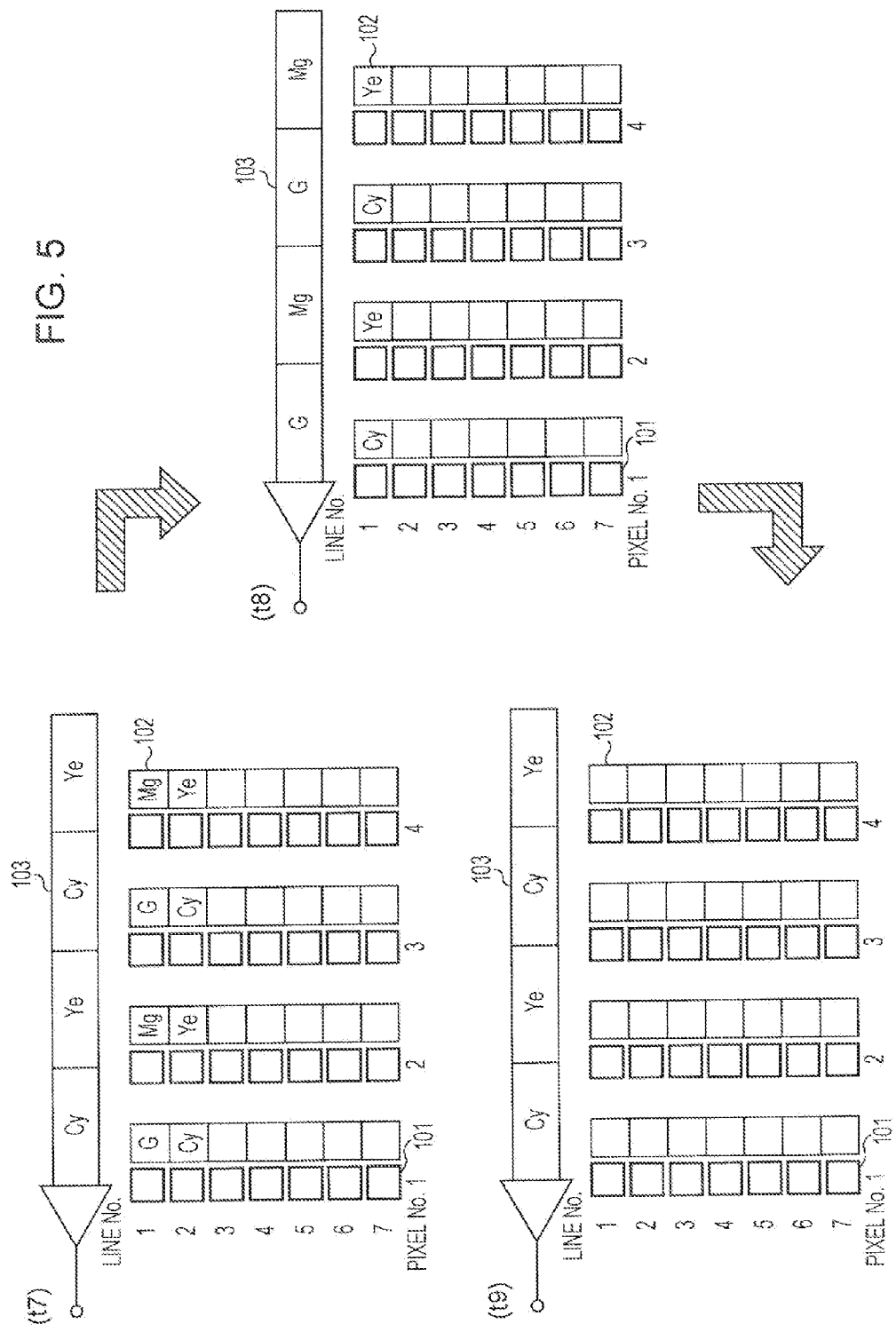
FIG. 5 is a diagram illustrating a detailed sequence of the progressive read-out process.

In FIGS. 3 to 5, as time passes from (t1) to (t9), states of the sequence of the progressive read-out process are shown at each time.

The timing (t1) of FIG. 3 shows the state immediately after capturing is performed using the imaging element which has been described with reference to FIG. 2. This shows the state in which charge subjected to the photoelectric conversion based on an amount of received light of wavelength corresponding to each color via each color filter (Mg, Cy, G, Ye) are accumulated in the pixel 101.

At the next timing (t2), the charge simultaneously moves (read-out) from each pixel 101 to the vertical CCD transfer section 102.

At the next timing (t3), the charge which has moved (read-out) to the vertical CCD transfer section 102 move in the vertical direction. In other words, the charge moves toward the horizontal CCD transfer section 103 in the drawing by one horizontal line.

In the horizontal CCD transfer section 103, pixel value data which is accumulated in the pixel 101 of the pixel line No. 1 is stored.

The charge corresponding to one horizontal line which is accumulated in the horizontal CCD transfer section 103 is output via the output section 104 and the output terminal 105 until the next timing (t4).

At the next timing (t4) of FIG. 4, the next pixel value data which is vertically transferred from the vertical CCD transfer section 102 is stored in the horizontal CCD transfer section 103.

The pixel value data, from the beginning, is the pixel value data which is accumulated in the pixel 101 of the pixel line No. 2. The pixel value data which is accumulated in the vertical CCD transfer section 102 is transferred once. The charge corresponding to one horizontal line which is accumulated in the horizontal COD transfer section 103 is output via the output section 104 and the output terminal 105 until the next timing (t5).

At the timing (t5) of FIG. 4, the pixel value data of the pixel 101 of the pixel line No. 3 is stored in the horizontal CCD transfer section 103. The pixel value data which is accumulated in the vertical CCD transfer section 102 is transferred once. The charge corresponding to one horizontal line which is accumulated in the horizontal CCD transfer section 103 is output via the output section 104 and the output terminal 105 until the next timing (t6).

At the timing (t6) of FIG. 4, the pixel value data of the pixel 101 of the pixel line No. 4 is stored in the horizontal CCD transfer section 103. The pixel value data which is accumulated in the vertical COD transfer section 102 is transferred once. The charge corresponding to one horizontal line which is accumulated in the horizontal CCD transfer section 103 is output via the output section 104 and the output terminal 105 until the next timing (t7).

At the timing (t7) of FIG. 5, the pixel value data of the pixel 101 of the pixel line No. 5 is stored in the horizontal CCD transfer section 103. The pixel value data which is accumulated in the vertical CCD transfer section 102 is transferred once. The charge corresponding to one horizontal line which is accumulated in the horizontal COD transfer section 103 is output via the output section 104 and the output terminal 105 until the next timing (t8).

At the timing (t8) of FIG. 5, the pixel value data of the pixel 101 of the pixel line No. 6 is stored in the horizontal CCD transfer section 103. The pixel value data which is accumulated in the vertical CCD transfer section 102 is transferred once. The charge corresponding to one horizontal line which is accumulated in the horizontal CCD transfer section 103 is output via the output section 104 and the output terminal 105 until the next timing (t9).

At the timing (t9) of FIG. 5, the pixel value data of the pixel 101 of the pixel line No. 7 is stored in the horizontal CCD transfer section 103. The charge corresponding to one horizontal line which is accumulated in the horizontal CCD transfer section 103 is output via the output section 104 and the output terminal 105.

In this way, sequentially, the pixel data on each horizontal line, that is, the pixel value signal corresponding to the charge which is subjected to the photoelectric conversion by the pixel 101, is sequentially transferred in the order of the vertical CCD transfer section 102, the horizontal COD transfer section 103, the output section 104, and the output terminal 105.

As described above, in "the progressive read-out" process, the vertical COD transfer section 102 performs one-step vertical transmission in every horizontal period to move the charge to the horizontal CCD transfer section 103. Then, the charge is transferred in the horizontal effective period via the output section 104, so that the signals of all the pixels are sequentially output from the output terminal 105.

3-2. Interlaced ODD Read-Out Process

Next, the sequence of "the interlaced ODD read-out" process will be described with reference to FIGS. 6 to 9.

In FIGS. 6 to 9, similar to FIGS. 3 to 5, the states of the interlaced ODD read-out process sequence at each time are shown as time passes from (t1) to (t11).

Figure 6:
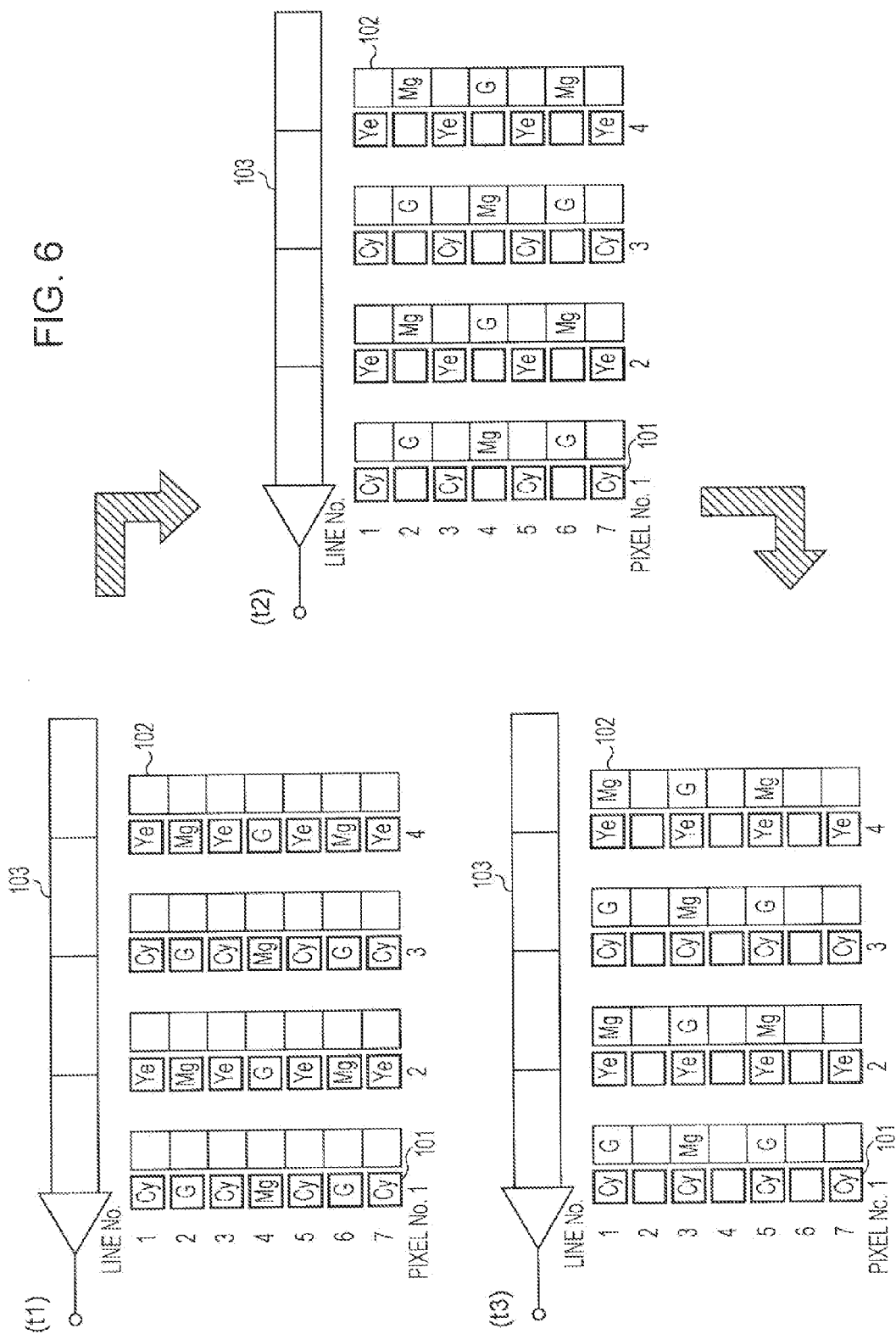
FIG. 6 is a diagram illustrating a detailed sequence of the interlaced ODD read-out process.

The timing (t1) of FIG. 6 shows the state immediately after capturing is performed using the imaging element which has been described with reference to FIG. 2. This shows the state in which charge subjected to the photoelectric conversion based on an amount of received light of wavelength corresponding to each color via each color filter (Mg, Cy, G, Ye) is accumulated in the pixel 101.

At the next timing (t2), the charge moves (read-out) to the vertical CCD transfer section 102 only from the even-numbered lines (Line No.=2, 4, 6, . . . ) of each pixel 101.

At the next timing (t3), the charge which has moved (read-out) to the vertical CCD transfer section 102 moves toward the horizontal CCD transfer section 103 by one horizontal line. The charge representing the pixel values of the even-numbered lines (Line No.=2, 4, 6, . . . ) is set to the respective horizontal positions of the odd-numbered lines which are in one upper position than those of corresponding even-numbered lines.

Figure 7:
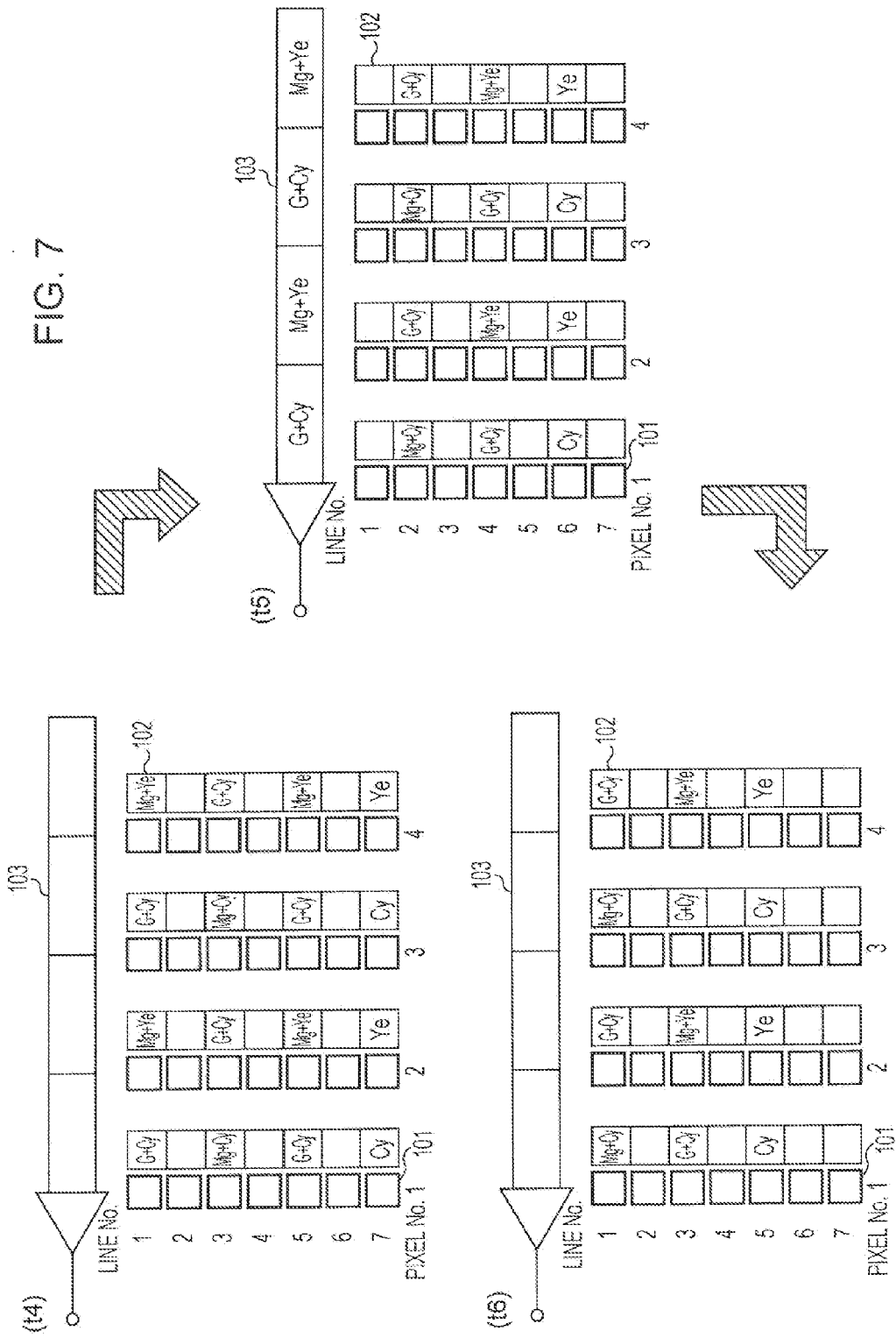
FIG. 7 is a diagram illustrating a detailed sequence of the interlaced ODD read-out process.

At the next timing (t4) of FIG. 7, the charge of the pixels on the odd-numbered lines (Line No.=1, 3, 5, . . . ) moves (read-out) to the vertical CCD transfer section 102. Through this process, the vertical CCD transfer section 102 is accumulated with charge as follows:

Addition charge value corresponding to the mixed pixel value of line No. 1+2;

Addition charge value corresponding to the mixed pixel value of line No. 3+4; and Addition charge value corresponding to the mixed pixel value on line No. 5+6.

At the next timing (t5), the following data is stored in the vertical CCD transfer section 102, that is:

Addition charge value corresponding to the mixed pixel value of line No. 1+2;

Addition charge value corresponding to the mixed pixel value of line No. 3+4;

Addition charge value corresponding to the mixed pixel value of line No. 5+6; and Pixel value of line No. 7.

These values are transferred toward the horizontal CCD transfer section 103 by one line.

The addition charge value corresponding to the mixed pixel value of line No. 1+2 is accumulated in the horizontal CCD transfer section 103, and is output via the output section 104 and the output terminal 105 until the next timing (t6).

Further, although only seven lines have been illustrated in the drawing for simplicity, in practice, there are hundreds of and thousands of lines to be set. Just as line No. 7 in the drawing, the independent pixel value is transferred to the vertical CCD transfer section 102 only in the case where the last line which is not set to pair is present.

At the timing (t6), the following data is transferred toward the horizontal CCD transfer section 103 by one line.

Addition charge value corresponding to the mixed pixel value of line No. 3+4;

Addition charge value corresponding to the mixed pixel value of line No. 5+6;

Pixel value of line No. 7; and

Figure 8:
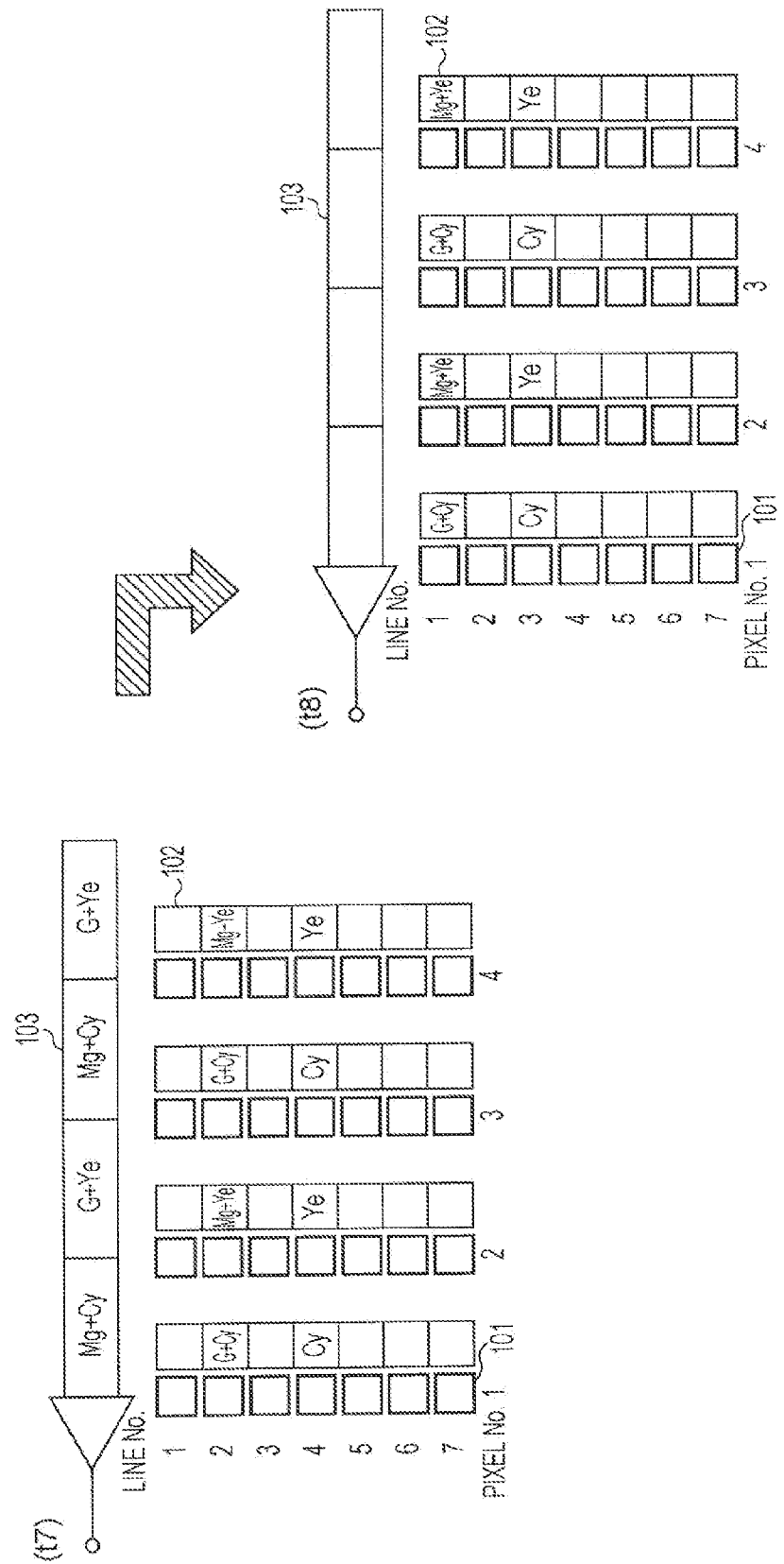
FIG. 8 is a diagram illustrating a detailed sequence of the interlaced ODD read-out process.

Further at the timing (t7) of FIG. 8, the following data is transferred toward the horizontal COD transfer section 103.

Addition charge value corresponding to the mixed pixel value of line No. 3+4;

Addition charge value corresponding to the mixed pixel value of line No. 5+6;

Pixel value of line No. 7; and

The addition charge value corresponding to the mixed pixel value of line No. 3+4 is accumulated in the horizontal CCD transfer section 103, and is output via the output section 104 and the output terminal 105 until the next timing (t8).

At the timing (t8) of FIG. 8, the following data is transferred toward the horizontal COD transfer section 103 by one line.

Addition charge value corresponding to the mixed pixel value of line No. 5+6;

Pixel value of line No. 7; and

Figure 9:
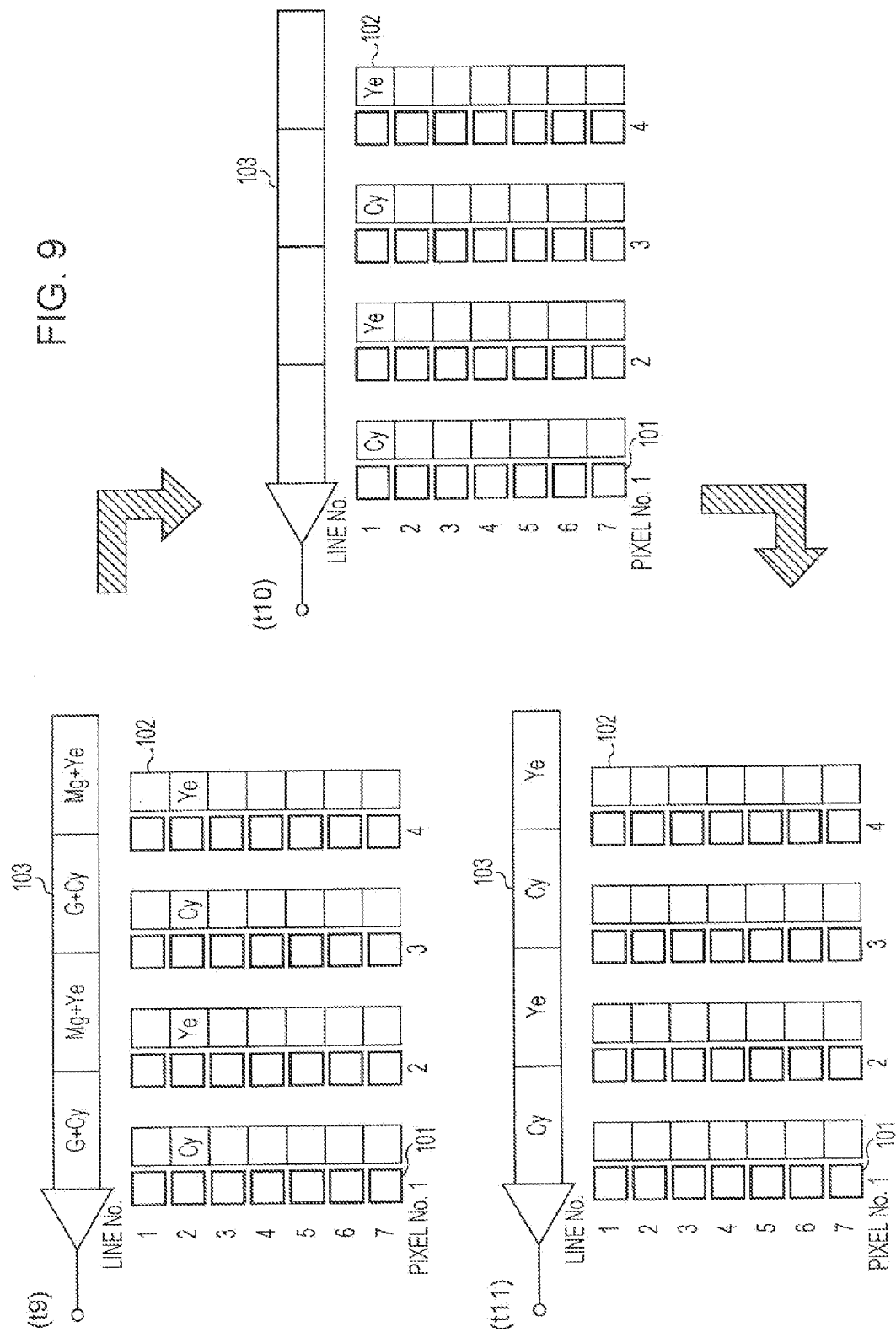
FIG. 9 is a diagram illustrating a detailed sequence of the interlaced ODD read-out process.

At the timing (t9) of FIG. 9, the following data is transferred toward the horizontal CCD transfer section 103 by one line.

Addition charge value corresponding to the mixed pixel value of line No. 5+6;

Pixel value of line No. 7; and

The addition charge value corresponding to the mixed pixel value of line No. 5+6 is accumulated in the horizontal CCD transfer section 103, and is output via the output section 104 and the output terminal 105 until the next timing (t10).

At the timing (t10) of FIG. 9, the pixel value of line No. 7 is transferred toward the horizontal CCD transfer section 103 by one line.

At the timing (t11) of FIG. 9, the pixel value of line No. 7 is transferred toward the horizontal CCD transfer section 103.

The addition charge value corresponding to the mixed pixel value of line No. 5+6 is accumulated in the horizontal CCD transfer section 103, and is output via the output section 104 and the output terminal 105.

As described above, in the interlaced ODD read-out process, the charge on the odd-numbered lines is mixed with those on the even-numbered lines such as 1st column+2nd column, 3rd column+4th column, and 5th column+6th column. The mixed signal charge is subjected to two-step vertical transmission in every horizontal period to move on a horizontal transmission path. Then, the charge is transferred in the horizontal effective period via the output section 104, so that the signals of all the pixels are sequentially output from the output terminal 105. Through this process, the signals which are made of the even-numbered lines mixed with the odd-numbered lines, such as 1st column+2nd column, 3rd column+4th column, and 5th column+6th column, are supplied to the signal processing section.

3-3. Interlaced EVEN Read-Out Process

Next, the sequence of "the interlaced EVEN read-out" process will be described with reference to FIGS. 10 to 13.

In FIGS. 10 to 13, the states of the interlaced EVEN read-out process sequence at each time are shown as time passes from (t1) to (t10).

The timing (t1) of FIG. 10 shows the state immediately after capturing is performed using the imaging element which has been described with reference to FIG. 2. This shows the state in which charge subjected to the photoelectric conversion based on an amount of received light of wavelength corresponding to each color via each color filter (Mg, Cy, G, Ye) is accumulated in the pixel 101.

At the next timing (t2), the charge moves (read-out) to the vertical CCD transfer section 102 only from the odd-numbered lines (Line No.=1, 3, 5, . . . ) of each pixel 101.

At the next timing (t3), the charge which has moved (read-out) to the vertical CCD transfer section 102 move toward the horizontal CCD transfer section 103 by one horizontal line. The charge representing the pixel values of the odd-numbered lines (Line No.=1, 3, 5, . . . ) is set to the respective lower positions of the even-numbered lines which are in one upper position than those of corresponding odd-numbered lines.

Figure 11:
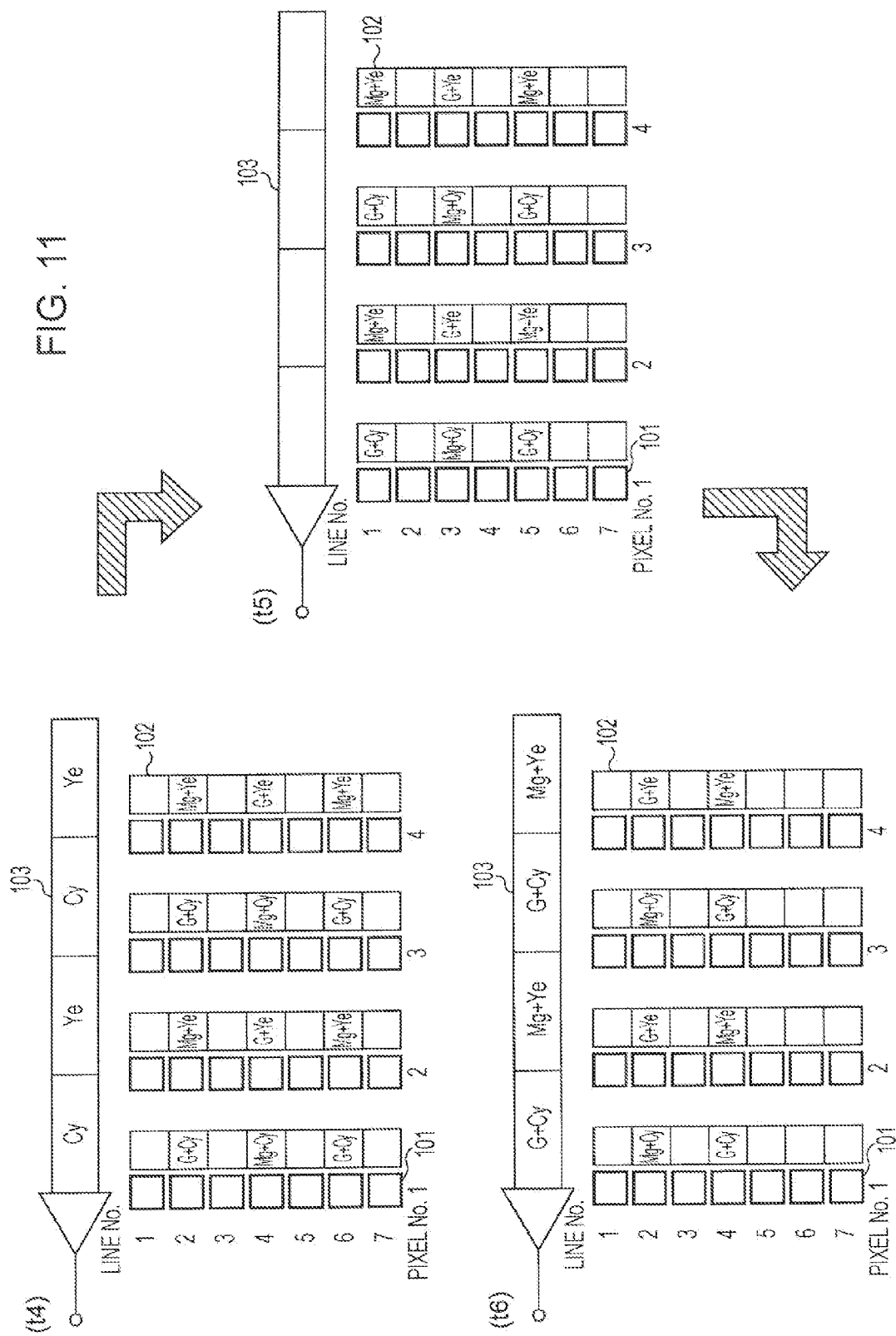
FIG. 11 is a diagram illustrating a detailed sequence of the interlaced EVEN read-out process.

At the next timing (t4) of FIG. 11, the charge of the pixels on the odd-numbered lines (Line No.=2, 4, 6, . . . ) moves (read-out) to the vertical CCD transfer section 102. Through this process, the vertical CCD transfer section 102 is accumulated with charge as follows:

Addition charge value corresponding to the mixed pixel value of line No. 2+3;

Addition charge value corresponding to the mixed pixel value of line No. 4+5; and Addition charge value corresponding to the mixed pixel value on line No. 6+7.

The pixel values (charge) of the uppermost stage line No. 1, which are accumulated in the horizontal CCD transfer section 103, are output via the output section 104 and the output terminal 105 until the next timing (t5).

At the next timing (t5), the following data is stored in the vertical CCD transfer section 102, that is:

Addition charge value corresponding to the mixed pixel value of line No. 2+3;

Addition charge value corresponding to the mixed pixel value of line No. 4+5; and Addition charge value corresponding to the mixed pixel value of line No. 6+7.

These values are transferred toward the horizontal CCD transfer section 103 by one line.

Further at the timing (t6) of FIG. 11, the following data is transferred toward the horizontal CCD transfer section 103 by one line.

Addition charge value corresponding to the mixed pixel value of line No. 2+3;

Addition charge value corresponding to the mixed pixel value of line No. 4+5;

Addition charge value corresponding to the mixed pixel value of line No. 6+7; and The addition charge value corresponding to the mixed pixel value of line No. 2+3 is accumulated in the horizontal CCD transfer section 103, and is output via the output section 104 and the output terminal 105 until the next timing (t7).

Figure 12:
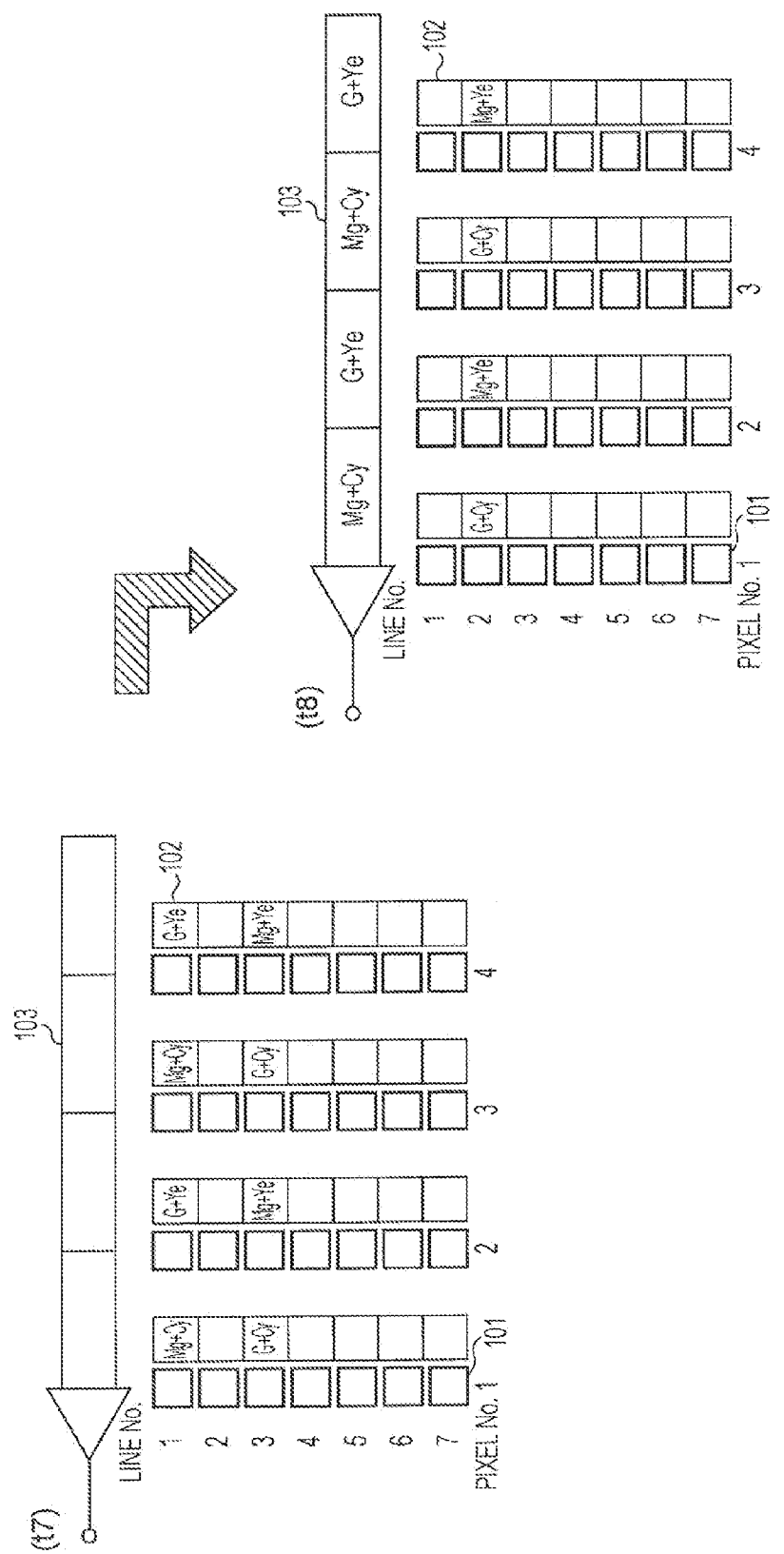
FIG. 12 is a diagram illustrating a detailed sequence of the interlaced EVEN read-out process.

At the timing (t7) of FIG. 12, the following data is transferred toward the horizontal CCD transfer section 103 by one line.

Addition charge value corresponding to the mixed pixel value of line No. 4+5;

Addition charge value corresponding to the mixed pixel value of line No. 6+7;

At the timing (t8) of FIG. 12, the following data is transferred toward the horizontal CCD transfer section 103.

Addition charge value corresponding to the mixed pixel value of line No. 4+5;

Addition charge value corresponding to the mixed pixel value of line No. 6+7; and The addition charge value corresponding to the mixed pixel value of line No. 4+5 is accumulated in the horizontal CCD transfer section 103, and is output via the output section 104 and the output terminal 105 until the next timing (t9).

Figure 13:
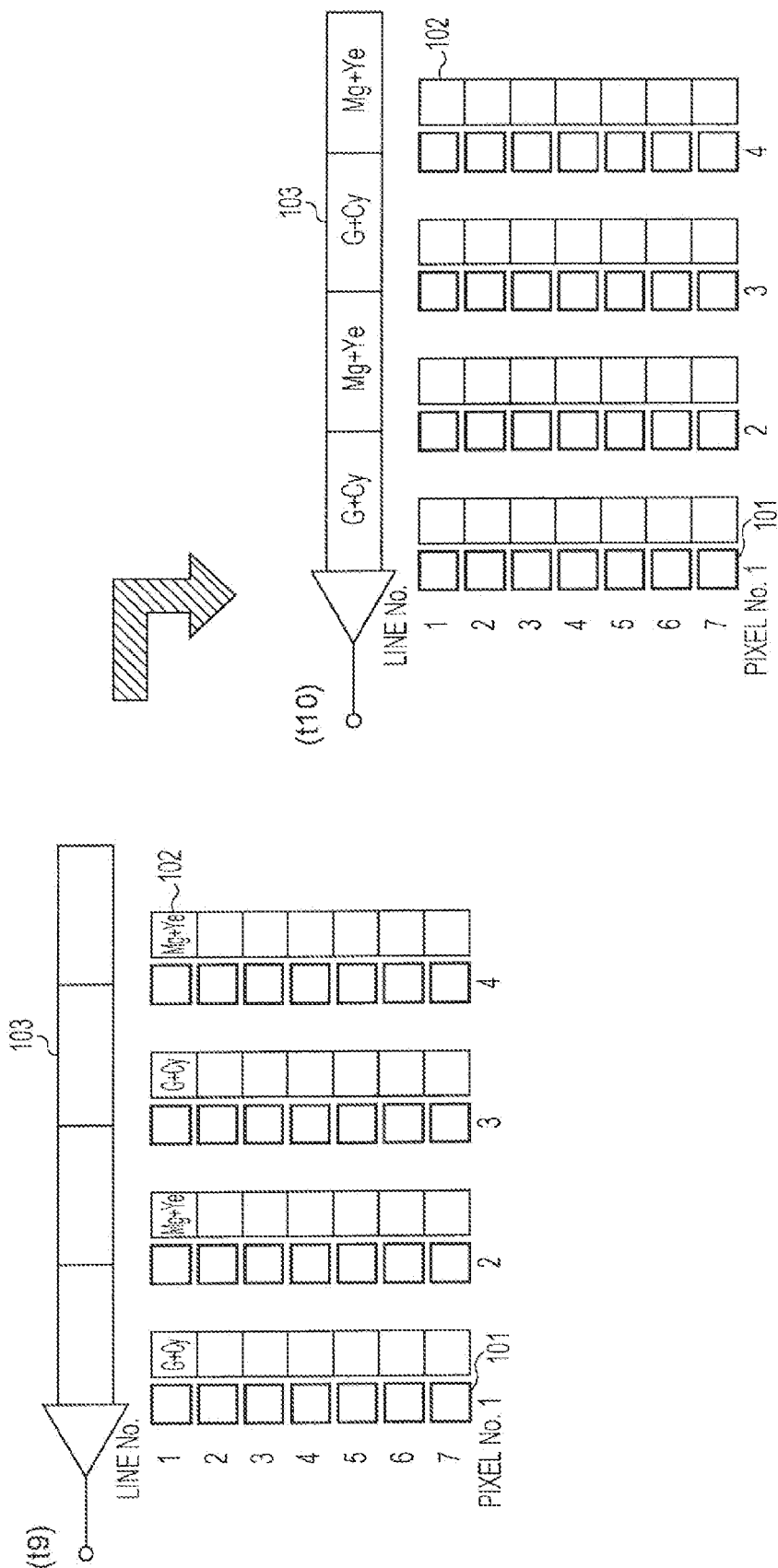
FIG. 13 is a diagram illustrating a detailed sequence of the interlaced EVEN read-out process.

At the timing (t9) of FIG. 13, the following data is transferred toward the horizontal CCD transfer section 103 by one line.

Addition charge value corresponding to the mixed pixel value of line No. 6+7

At the timing (t10) of FIG. 13, the addition charge value corresponding to the mixed pixel value of line No. 6+7 is accumulated in the horizontal CCD transfer section 103, and is output via the output section 104 and the output terminal 105.

As described above, in the interlaced EVEN read-out process, the charge on the odd-numbered lines is mixed with those on the even-numbered lines such as 2nd column+3rd column, 4th column+5th column, and 6th column+7th column. The mixed signal charge is subjected to two-step vertical transmission in every horizontal period to move on a horizontal transmission path. Then, the charge is transferred in the horizontal effective period via the output section 104, so that the signals of all the pixels are sequentially output from the output terminal 105. Through this process, the signals which are made of the even-numbered lines mixed with the odd-numbered lines, such as 2nd column+3rd column, 4th column+5th column, and 6th column+7th column, are supplied to the signal processing section.

4. Configuration and Processes of Imaging Device

4-1. Configuration and Signal Processing of Imaging Device

Figure 14:
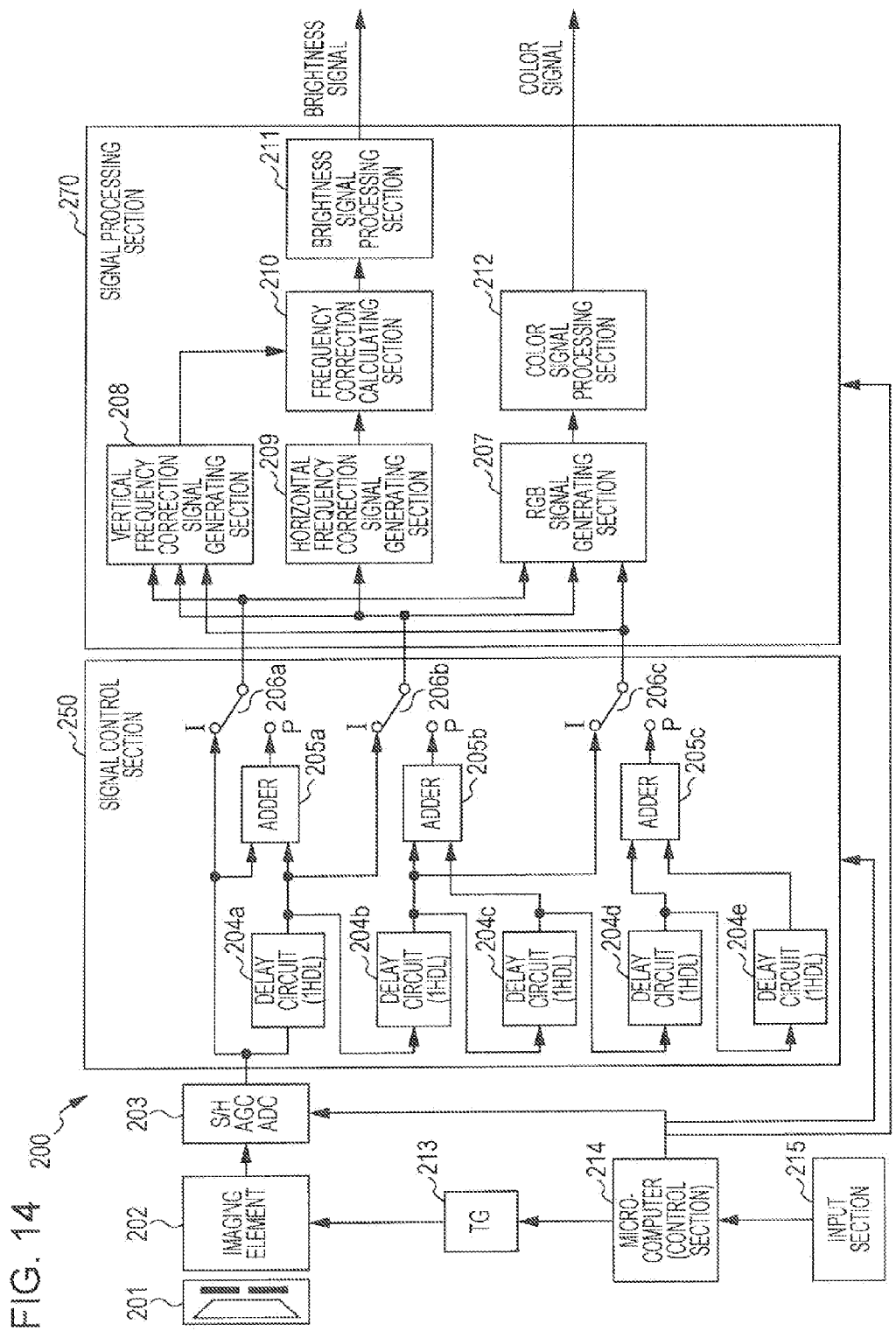
FIG. 14 is a diagram illustrating the configuration of an imaging device and an example of signal processing according to an embodiment of the present disclosure.

In FIG. 14, the block diagram illustrating the imaging device according to an embodiment of the present disclosure is shown.

The imaging device 200 shown in FIG. 14 has the configuration capable of switching freely a signal read-out from the imaging element 202 to be set to either of "the progressive read-out" and "the interlaced read-out". Further, in the case of the interlaced read-out, there are two kinds of the ODD read-out and the EVEN read-out as described above, but, for example, a process is performed in which the interlaced ODD read-out, the interlaced EVEN read-out, the interlaced ODD read-out, and the interlaced EVEN read-out are operated alternatively in every vertical synchronization.

The switching of the read-out mode between "the progressive read-out" and "the interlaced read-out" is controlled by a micro-computer (control section) 214. For example, the micro-computer (control section) 214 detects a user input via an input section 215, and controls the imaging element 202 via a timing generator (TG) 213, so that the switching of the read-out mode is controlled.

The process of the imaging device 200 shown in FIG. 14 will be described.

Light incident via a lens 201 is subjected to photoelectric conversion by the imaging element 202, and an electric signal corresponding to an input image is output. The output signal corresponds to the output of the output terminal 105 of the imaging element shown in FIG. 2. Further, as described above with reference to FIGS. 3 to 13, the output of the imaging element 202 in "the progressive read-out" process is different from that in "the interlaced read-out" process. The main difference is in that, for example, signals of the respective pixels are sequentially output in "the progressive read-out" process, but in "the interlaced read-out" process, the mixed signals of two pixels are output.

The output signal of the imaging element 202 is subjected to a correlated double sampling process and a gain control (AGC) process in an analog front-end 203, and then analog-digital (AD) conversion is performed thereon to be converted into a digital signal.

The digital signal is input to a signal control section 250 shown in FIG. 14.

As shown in FIG. 14, the signal control section 250 includes: a plurality of delay circuits 204a to 204e which are connected in series to make a signal output from the imaging element 202 delayed by a period corresponding to one horizontal line; an adder 205a which adds the output of the horizontal line from the imaging element 202 to the output of the delay circuit 204a; adders 205b and 205c which add delayed signals generated by the plurality of the delay circuits in different delay periods; and switches 206a to 206c which select and output a signal to a signal processing section 270, the signal including at least any one of an undelayed signal output from the imaging element, a delayed signal passed through only the delay circuits, and an addition signal passed through the adders.

The digital imaging signal of the output of the analog front-end 203 is input to the 1H delay circuit 204a, the adder 205a, and "the I-side input terminal" which is on one side of the changeover switch 206 of the signal control section 250.

Further, the symbol "I" of the switches 206a to 206c shown in the drawing represents "interlace", and the symbol "P" represents "progressive".

When "the interlaced read-out" is performed, the switches 206a to 206c are set to the "I" side; when "the progressive read-out" is performed, the switches 206a to 206c are set to the "P" side. The control on these switches is performed by the micro-computer (control section) 214.

The terminology "1H" in the 1H delay circuits 204a to 204e of the signal control section 250 represents one horizontal period, that is, a period of time corresponding to the read-out period of one horizontal line of the imaging signal. Each of the 1H delay circuits 204a to 204e performs the signal delay process for the read-out period of one line.

The output signal of the 1H delay circuit 204a is input to the 1H delay circuit 204b, the adder 205a, and the I-side input terminal of the changeover switch 206b.

The output signal of the 1H delay circuit 204b is input to the 1H delay circuit 204c, the adder 205b, and the I-side input terminal of the changeover switch 206c.

The output signal of the 1H delay circuit 204c is input to the 1H delay circuit 204d and the adder 205b.

The output signal of the 1H delay circuit 204d is input to the 1H delay circuit 204e and the adder 205c.

The output signal of the 1H delay circuit 204e is input to the adder 205c.

The output of the adder 205a is input to the P-side input terminal of the changeover switch 206a.

The output of the adder 205b is input to the P-side input terminal of the changeover switch 206b.

The output of the adder 205c is input to the P-side input terminal of the changeover switch 206c.

Furthermore, the output of the changeover switch 206a is input to an RGB signal generating section 207 and a vertical frequency correction signal generating section 208 of the signal processing section 270.

The output of the changeover switch 206b is input to the RGB signal generating section 207, the vertical frequency correction signal generating section 208, and a horizontal frequency correction signal generating section 209.

The output of the changeover switch 206c is input to the RGB signal generating section 207 and the vertical frequency correction signal generating section 208.

The RGB signal generating section 207 receives the output signals of the changeover switches 206a, 206b, and 206c, and generates an R signal, a G signal, and a B signal.

The output of the vertical frequency correction signal generating section 208 and the output of the horizontal frequency correction signal generating section 209 are input to a frequency correction calculating section 210. The frequency correction calculating section 210 generates a brightness signal which is appropriately processed to correct its frequency in the vertical and horizontal direction based on the input signal, and inputs the brightness signal to a brightness signal processing section 211. The brightness signal processing section 211 implements other appropriate processes such as a γ correction process and a peak clip on the brightness signal, and generates and outputs a brightness signal as the output signal of the imaging device.

An RGB signal generated by the RGB signal generating section 207 is input to a color signal processing section 212. Regarding the RGB signal generated by the RGB signal generating section 207, the color signal processing section 212 implements necessary processes to a color signal, such as a white balance (WB) control, a gamma (γ) correction process, and a color-difference signal generating process, and generates and outputs the color signal as the output signal of the imaging device.

The timing signal generating section (TG) 213 generates a signal for driving the imaging element 202. By changing the output signal of the timing signal generating section (TG) 213, the signal read-out operation of the imaging element 202 can be set to each of the interlaced ODD read-out, the interlaced EVEN read-out, and the progressive read-out. Further, the operations of the respective circuits are controlled by the micro-computer (control section) 214.

In the imaging device 200 shown in FIG. 14 according to an embodiment of the present disclosure, the signal control section 260 receives an input signal read-out from the imaging element 202, which is read in either of the interlace scheme or the progressive scheme. Then, regarding the input signal, the imaging device 200 performs a different process according to the read-out scheme to generate the output signal for the signal processing section 270. Specifically, when the read-out scheme from the imaging element 202 is either the interlace scheme or the progressive scheme, the signal control section 250 performs a control of generating a signal including the same color information to output the signal to the signal processing section 270.

Hereinafter, the signal processing in the interlaced read-out process and the signal processing in the progressive read-out process will be described in detail.

4-2. Detailed Signal Processing of Interlaced Read-Out Process

Next, an operation example of the imaging device will be described separately in the case of the interlaced read-out operation and the case of the progressive read-out operation.

In the case of the interlaced read-out operation, the timing signal generating section (TG) 213 allows the imaging element 202 to alternatively operate in every vertical synchronization, just like the order of the interlaced ODD read-out, the interlaced EVEN read-out, the interlaced ODD read-out, and the interlaced EVEN read-out.

The flow of a signal in the interlaced read-out operation will be described with reference to FIG. 15. The bold solid line shown in the signal control section 250 of FIG. 15 is the flow of a signal in the interlaced read-out operation. The changeover switches 206a, 206b, and 206c select the I-side (interlace side) input.

As can be understood from FIG. 15, in the interlaced read-out operation, only the 1H delay circuit 204a and the 1H delay circuit 204b are used in the signal control section 250, and the other 1H delay circuits 204c to 204e and the adders 205a to 205c are not used.

(a) The changeover switch 206a outputs an undelayed read-out signal from the imaging element.

(b) The changeover switch 206b outputs a 1H delayed read-out signal from the imaging element.

(c) The changeover switch 206c outputs a 2H delayed read-out signal from the imaging element.

In the signal processing section 270, the vertical frequency correction signal generating section 208 and the RGB signal generating section 207 receive the above-mentioned signals (a) to (c) from the imaging element, that is:

(Signal a) Undelayed signal (the output of the changeover switch 206a);

(Signal b) 1H delayed signal (the output of the changeover switch 206b); and (Signal c) 2H delayed signal (the output of the changeover switch 206c).

In addition, the horizontal frequency correction signal generating section 209 of the signal processing section 270 receives the above-mentioned signal (b) from the imaging element, that is, (Signal b) 1H delayed signal (the output of the changeover switch 206b).

Although the horizontal line No. of the output signal corresponds to an even-numbered line or an odd-numbered line, the output signal of the changeover switch 206b becomes Mg+G+Cy+Ye=2R+3G+2B when the adjacent two pixels are mixed.

Further, the relation between four kinds of complementary colors of G (Green), Mg (Magenta), Ye (Yellow), and Cy (Cyan) which are obtained by the imaging element, and the output color signals of R (Red), G (Green), and B (Blue) is as follows:

Ye=G+R;
Mg=R+B; and
Cy=G+B.

The sequence of the interlaced read-out process is the same as described with reference to FIGS. 6 to 13, and the read-out signal is typically Mg+G+Cy+Ye when the adjacent two pixels are mixed.

When the signal is converted according to the above-mentioned relational expression, the signal becomes as follows:

$$Mg + G + Cy + Ye = (R+B) + G + (G+B) + (G+R)$$
$$= 2R + 3G + 2B.$$

The output signal of the changeover switch 206b becomes Mg+G+Cy+Ye=2R+3G+2B when the adjacent two pixels are mixed.

The horizontal frequency correction signal generating section 209 generates a horizontal frequency correction signal which adjusts the characteristic of the above signal calculated on the basis of the output signal of the changeover switch 206b to have an appropriate frequency characteristic as a low frequency signal of the brightness signal. Then, the generated signal is output to the frequency correction calculating section 210.

In addition, the vertical frequency correction signal generating section 208 receives the following signals:

(Signal a) Undelayed signal (the output of the changeover switch 206a);

(Signal b) 1H delayed signal (the output of the changeover switch 206b); and (Signal c) 2H delayed signal (the output of the changeover switch 206c).

The vertical frequency correction signal generating section 208 uses these signals to generate the following signal:

Vertical frequency correction signal=(1H delayed signal)× 2−((Undelayed signal)+(2H delayed signal)).

Then, the generated signal is output to the frequency correction calculating section 210.

The frequency correction calculating section 210 receives the following signals:

the horizontal frequency correction signal which is output from the horizontal frequency correction signal generating section 209; and the vertical frequency correction signal which is output from the vertical frequency correction signal generating section 208.

Then, the frequency correction calculating section 210 generates the appropriately frequency-corrected brightness signal, and inputs the generated signal to the brightness signal processing section 211. The brightness signal processing section 211 implements the other appropriate processing, such as a γ-process and a peak clip, on the brightness signal to generate and output the brightness output signal of the imaging device.

Next, a color signal generating process in the interlaced read-out process will be described.

The RGB signal generating section 207 receives the following signals a to c from the imaging element:

(Signal a) Undelayed signal (the output of the changeover switch 206a);

(Signal b) 1H delayed signal (the output of the changeover switch 206b); and (Signal c) 2H delayed signal (the output of the changeover switch 206c).

First, as described with reference to FIGS. 6 to 9 and FIGS. 10 to 13, even in any of these cases of the interlaced ODD read-out and the interlaced EVEN read-out, the following rows are set:

the row which outputs (G+Cy), (Mg+Ye), (G+Cy), and (Mg+Ye); and the row which outputs (Mg+Cy), (G+Ye), (Mg+Cy), and (G+Ye).

Taking the differences of two pixels which are adjacent to the output of each imaging element, the following signal is obtained:

(G+Cy)−(Mg+Ye); or
(Mg+Cy)−(G+Ye).

When the relational expressions described above, that is, Ye=G+R, Mg=R+B, and Cy=G+B, are converted according to the above-mentioned relational expressions, the following two kinds of signals are obtained.

(G+Cy)−(Mg+Ye)=(G+G+B)−(R+B+G+R)=G−2R
(Mg+Cy)−(G+Ye)=(R+B+G+B)−(G+G+R)=2B−G

The RGB signal generating section 207 receives each of the following signals:

(Signal a) Undelayed signal (the output of the changeover switch 206a);

(Signal b) 1H delayed signal (the output of the changeover switch 206b); and (Signal c) 2H delayed signal (the output of the changeover switch 206c).

Then, first, the following three kinds of signals are generated:

(1) (Signal b)=(1H delayed signal);

(2) (Signal a)+(Signal c)=(Undelayed signal)+(2H delayed signal); and (3) (Signal b)×2+((Signal a)+(Signal c))=(1H delayed signal)×2+((Undelayed signal)+(2H delayed signal)).

In the row corresponding to (1) (Signal b)=1H delayed signal=2R−G, the following signals can be obtained:

(2) (Signal a)+(Signal c)=(Undelayed signal)+(2H delayed signal))=(2B−G)×2; and (3) (Signal b)×2+((Signal a)+(Signal c))=(1H delayed signal)×2+((Undelayed signal)+(2H delayed signal))=(2R+3G+2B)×2.

In addition, in the row corresponding to (1) (Signal b)=1H delayed signal=2B−G, the following signals can be obtained:

(2) (Signal a)+(Signal c)=(Undelayed signal)+(2H delayed signal))=(2R−G)×2; and (3) (Signal b)×2+((Signal a)+(Signal c))=(1H delayed signal)×2+((Undelayed signal)±(2H delayed signal))=(2R+3G+2B)×2.

Therefore, even in any of these cases, three kinds of signals of 2R−G, 2B−G, and 2R+3G+2B are obtained, and the color signals R, G, and B can be calculated according to the following relational expressions:

$$R = R\text{mat1} \times \text{Signal}(2R-G) + R\text{mat2} \times \text{Signal}(2B-G) + R\text{mat3} \times \text{Signal}(2R+3G+2B)$$

$$G = G\text{mat1} \times \text{Signal}(2R-G) + G\text{mat2} \times \text{Signal}(2B-G) + G\text{mat3} \times \text{Signal}(2R+3G+2B); \text{ and}$$

$$B = B\text{mat1} \times \text{Signal}(2R-G) + B\text{mat2} \times \text{Signal}(2B-G) + B\text{mat3} \times \text{Signal}(2R+3G+2B).$$

Further, Rmat1 to Bmat3 are parameters (matrix coefficients) which are used as predefined coefficients.

The RGB signal generating section 207 receives each of the following signals:

(Signal a) Undelayed signal (the output of the changeover switch 206a);

(Signal b) 1H delayed signal (the output of the changeover switch 206b); and (Signal c) 2H delayed signal (the output of the changeover switch 206c).

Then, the RGB signal generating section 207 performs the above-mentioned calculations, generates the RGB signal, and outputs the generated RGB signal to the color signal processing section 212.

Regarding the input signal, the color signal processing section 212 implements necessary processes to a color signal, such as the white balance (WB) control, the γ process, and a color-difference signal generating process, and generates and outputs the color signal as the output signal of the imaging device.

As shown in FIG. 15, when the read-out scheme from the imaging element 202 is set to the interlaced read-out scheme in which a 2-pixel mixed signal is read out, the signal control section 250 outputs in parallel the undelayed signal from the imaging element, the first delayed signal which is the signal delayed by one horizontal line output period by the delay circuit, and the second delayed signal which is the signal delayed by two horizontal line output periods generated via two delay circuits, to the signal processing section 250.

In the signal processing section 270, the vertical frequency correction signal generating section 208 and the RGB signal generating section 207 receive the outputs of a plurality of adjacent horizontal lines in parallel from the signal control section 250, which are generated from the output of the imaging element 202. Further, the horizontal frequency correction signal generating section 209 receives and processes the output of one horizontal line which is output from the imaging element from the signal control section 250.

4-3. Detailed Signal Processing of Progressive Read-Out Process

Next, the flow of the signal in the progressive read-out operation will be described with reference to FIG. 16. The bold solid line shown in the signal control section 250 of FIG. 16 shows the flow of the signal in the progressive read-out operation. The changeover switches 206a, 206b, and 206c select the P-side (progressive side) inputs.

As can be seen from FIG. 16, in the progressive read-out operation, all of the 1H delay circuit 204a to the 1H delay circuit 204e and the adders 205a to 205c in the signal control section 250 are used.

(a) The changeover switch 206a outputs the addition value of the undelayed read-out signal from the imaging element and the 1H delayed read-out signal from the imaging element.

(b) The changeover switch 206b outputs the addition value of the 2H delayed read-out signal from the imaging element and the 3H delayed read-out signal from the imaging element.

(c) The changeover switch 206c outputs the addition value of the 4H delayed read-out signal from the imaging element and the 5H delayed read-out signal from the imaging element.

In the signal processing section 270, the vertical frequency correction signal generating section 208 and the RGB signal generating section 207 receive the above-mentioned signals (a) to (c) from the imaging element, that is:

(Signal a) Undelayed signal+1H delayed signal (the output of the changeover switch 206a);

(Signal b) 2H delayed signal+3H delayed signal (the output of the changeover switch 206b); and (Signal c) 4H delayed signal+5H delayed signal (the output of the changeover switch 206c).

In addition, the horizontal frequency correction signal generating section 209 of the signal processing section 270 receives the above-mentioned signal (b) from the imaging element, that is, (Signal b) 2H delayed signal+3H delayed signal (the output of the changeover switch 206b).

In the progressive read-out operation, the timing signal generating circuit (TG) 213 causes the imaging element 202 to operate typically in the progressive read-out. The changeover switches 206a, 206b, and 206c select the P-side inputs, and thus the output signals of the adders 205a, 205b, and 205c are selected to be output to the signal processing section 270.

In this process, even when the horizontal line No. of the output signal is the even-numbered line or the odd-numbered line, the output signal of the changeover switch 206b becomes Mg+G+Cy+Ye when the adjacent two pixels are mixed.

In other words, (Signal b) 2H delayed signal+3H delayed signal (the output of the changeover switch 206b) becomes, for example, the following values in the progressive read-out process sequence which has been described with reference to FIGS. 3 to 5:

the addition value of the storage values of the horizontal CCD transfer section 103 at the timing (t3) of FIG. 3 and the timing (t4) of FIG. 4;

the addition value of the storage values of the horizontal CCD transfer section 103 at the timing (t4) of FIG. 4 and the timing (t5) of FIG. 4; and the addition value of the storage values of the horizontal CCD transfer section 103 at the timing (t5) of FIG. 4 and the timing (t6) of FIG. 4.

Therefore, the output signal of the changeover switch 206b becomes Mg+G+Cy+Ye when the adjacent two pixels are mixed. The output signal of the changeover switch 206b is the same as that of the changeover switch 206b in the interlaced read-out process which has been described above with reference to FIG. 15.

As described above, the relation between four kinds of complementary colors of G (Green), Mg (Magenta), Ye (Yellow), and Cy (Cyan) which are obtained by the imaging element, and the output color signals of R (Red), G (Green), and B (Blue) is as follows:

Ye=G+R;
Mg=R+B; and
Cy=G+B.

Therefore, the output signal of the changeover switch 206b becomes Mg+G+Cy+Ye=2R+3G+2B when the adjacent two pixels are mixed.

The horizontal frequency correction signal generating section 209 generates a horizontal frequency correction signal which adjusts the characteristic of the above signal calculated on the basis of the output signal of the changeover switch 206b to have an appropriate frequency characteristic as a low frequency signal of the brightness signal. Then, the generated signal is output to the frequency correction calculating section 210.

In addition, the vertical frequency correction signal generating section 208 receives the following signals:

(Signal a) Undelayed signal+1H delayed signal (the output of the changeover switch 206a);

(Signal b) 2H delayed signal+3H delayed signal (the output of the changeover switch 206b); and (Signal c) 4H delayed signal+5H delayed signal (the output of the changeover switch 206c).

The vertical frequency correction signal generating section 208 uses these signals to generate the following signal:

Vertical frequency correction signal=(2H delayed signal+3H delayed signal)×2−((Undelayed signal+1H delayed signal)+(4H delayed signal+5H delayed signal)).

Then, the generated signal is output to the frequency correction calculating section 210.

The frequency correction calculating section 210 receives the following signals:

the horizontal frequency correction signal which is output from the horizontal frequency correction signal generating section 209; and the vertical frequency correction signal which is output from the vertical frequency correction signal generating section 208.

Then, the frequency correction calculating section 210 generates the appropriately frequency-corrected brightness signal, and inputs the generated signal to the brightness signal processing section 211. The brightness signal processing section 211 implements the other appropriate processing such as a γ-process and a peak clip on the brightness signal to generate and output the brightness output signal of the imaging device.

Next, a color signal generating process in the progressive read-out process will be described.

The RGB signal generating section 207 receives the following signals a to c from the imaging element:

(Signal a) Undelayed signal+1H delayed signal (the output of the changeover switch 206a);

(Signal b) 2H delayed signal+3H delayed signal (the output of the changeover switch 206b); and (Signal c) 4H delayed signal+5H delayed signal (the output of the changeover switch 206c).

These signals a to c become, for example, the following values in the progressive read-out process sequence which has been described with reference to FIGS. 3 to 5:

the addition value of the storage values of the horizontal CCD transfer section 103 at the timing (t3) of FIG. 3 and the timing (t4) of FIG. 4;

the addition value of the storage values of the horizontal CCD transfer section 103 at the timing (t4) of FIG. 4 and the timing (t5) of FIG. 4; and the addition value of the storage values of the horizontal COD transfer section 103 at the timing (t5) of FIG. 4 and the timing (t6) of FIG. 4.

In other words, the outputs of the changeover switches 206a to 206c become any one of the following outputs:

the repeated outputs of (G+Cy), (Mg+Ye), (G+Cy), and (Mg+Ye); and the repeated outputs of (Mg+Cy), (G+Ye), (Mg+Cy), and (G+Ye).

These outputs are the same as those of the changeover switches 206a to 206c in the interlaced read-out operation which has been described with reference to FIG. 15.

The RGB signal generating section 207 receives each of the following signals:

(Signal a) Undelayed signal+1H delayed signal (the output of the changeover switch 206a);

(Signal b) 2H delayed signal+3H delayed signal (the output of the changeover switch 206b); and (Signal c) 4H delayed signal+5H delayed signal (the output of the changeover switch 206c).

Then, first, the following three kinds of signals are generated:

(1) (Signal b)=(2H delayed signal+3H delayed signal);

(2) (Signal a)+(Signal c)=(Undelayed signal+1H delayed signal)+(4H delayed signal+5H delayed signal); and (3) (Signal b)×2+((Signal a)+(Signal c))=(2H delayed signal+3H delayed signal)×2+((Undelayed signal+1H delayed signal)+(4H delayed signal+5H delayed signal)).

In the row corresponding to (1) (Signal b)=(2H delayed signal+3H delayed signal)=2R−G, the following signals can be obtained:

(2) (Signal a)+(Signal c)=(Undelayed signal+1H delayed signal)+(4H delayed signal+5H delayed signal)=(2B−G)×2; and (3) (Signal b)×2+((Signal a)+(Signal c))=(2H delayed signal+3H delayed signal)×2+((Undelayed signal+1H delayed signal)+(4H delayed signal+5H delayed signal))=(2R+3G+2B)×2.

In addition, in the row corresponding to (1) (Signal b)=(2H delayed signal+3H delayed signal)=2B−G, the following signals can be obtained:

(2) (Signal a)+(Signal c)=(Undelayed signal+1H delayed signal)+(4H delayed signal+5H delayed signal)=(2R−G)×2; and (3) (Signal b)×2+((Signal a)+(Signal c))−(2H delayed signal+3H delayed signal)×2+((Undelayed signal+1H delayed signal)+(4H delayed signal+5H delayed signal))=(2R+3G+2B)×2.

Therefore, even in any of these cases, three kinds of signals of 2R−G, 2B−G, and 2R+3G+2B are obtained, and the color signals R, G, and B can be calculated according to the following relational expressions:

$R = R\text{mat}1 \times \text{Signal}(2R-G) + R\text{mat}2 \times \text{Signal}(2B-G) + R\text{mat}3 \times \text{Signal}(2R+3G+2B);$ $G = G\text{mat}1 \times \text{Signal}(2R-G) + G\text{mat}2 \times \text{Signal}(2B-G) + G\text{mat}3 \times \text{Signal}(2R+3G+2E);$ and $B = B\text{mat}1 \times \text{Signal}(2R-G) + B\text{mat}2 \times \text{Signal}(2B-G) + B\text{mat}3 \times \text{Signal}(2R+3G+2E).$ Further, Rmat1 to Bmat3 are parameters which are used as predefined coefficients.

the RGB signal generating section 207 receives each of the following signals:

(Signal a) Undelayed signal+1H delayed signal (the output of the changeover switch 206a);

(Signal b) 2H delayed signal+3H delayed signal (the output of the changeover switch 206b); and (Signal c) 4H delayed signal+5H delayed signal (the output of the changeover switch 206c).

Then, the RGB signal generating section 207 generates the RGB signal to output the generated RGB signal to the color signal processing section 212.

Regarding the input signal, the color signal processing section 212 implements necessary processes to a color signal, such as the white balance (WB) control, the γ process, and a color-difference signal generating process, and generates and outputs the color signal as the output signal of the imaging device.

As shown in FIG. 16, when the read-out scheme of the imaging element 202 is set to the progressive read-out scheme in which reading-out is performed in a pixel unit, the following signals are output to the signal processing section 270 in parallel:

a first addition signal which is generated by the adder, which adds the undelayed signal from the imaging element to a first delayed signal which is delayed by one horizontal line output period by the delay circuit;

a second addition signal which is generated by the adder, which adds a second delayed signal to a third delayed signal, wherein the second delayed signal is delayed by two horizontal line output periods which are generated via two delay circuits, and wherein the third delayed signal is delayed by three horizontal line output periods which are generated via three delay circuits; and a third addition signal which is generated by the adder, which adds a fourth delayed signal to a fifth delayed signal, wherein the fourth delayed signal is delayed by four horizontal line output periods which are generated via four delay circuits, and wherein the fifth delayed signal is delayed by five horizontal line output periods which are generated via five delay circuits.

In the signal processing section 270, the vertical frequency correction signal generating section 208 and the RGB signal generating section 207 receive the outputs of a plurality of adjacent horizontal lines in parallel from the signal control section 250, which are generated from the output of the imaging element 202. The horizontal frequency correction signal generating section 209 receives and processes the addition signal of one horizontal line which is output from the imaging element from the signal control section 250.

As described with reference to FIGS. 14 to 16, in the imaging device according to the embodiment of the present disclosure, the signal control section 250 is configured to output the signal to the signal processing section 270 as the same data even in either of the cases of the interlaced read-out operation and the progressive read-out operation.

Therefore, using one common signal processing section 270, it is possible to perform the same signal processing on the read-out signal according to two different read-out schemes of the interlaced read-out operation and the progressive read-out operation. With this configuration, even when different read-out schemes are used, an image with the brightness signals and the color signals of the equivalent characteristics including vertical resolution can be generated and output. In other words, even though the read-out schemes are different, an image with a uniform quality can be output without generating difference in the output signals.

Hereinbefore, the present disclosure has been described with reference to the specific embodiments. However, it is apparent to those skilled in the art from this disclosure that modifications and substitutions can be made herein without departing from the scope of the present disclosure. In other words, the present disclosure has been disclosed using the form of examples, but it is not to be interpreted as limiting. In order to determine the spirit of the present disclosure, the claims may be taken into consideration.

In addition, a series of processes described in the specification may be executed by hardware, software, or a combination of the two. When the processes are performed using software, a program in which processing sequences are recorded may be installed and executed in a memory device of a computer which is assembled in dedicated hardware, or the program may be installed and executed in a general purpose computer in which various kinds of processes are executable. For example, the program may be previously recorded in a recording medium. In addition to install the program to a computer from the recording medium, the program may be received via a network such as a LAN (Local Area Network) and the Internet, and be installed in a recording medium such as a built-in hard disk.

Further, the various kinds of processes which are described in the specification may be performed in chronological order according to the description, and furthermore may be performed in parallel or separately according to processing capability of the apparatus for performing the processes or according to necessary. In addition, the system described in this specification has a configuration in which a plurality of devices is logically assembled, and these devices do not necessary to be in the same housing.

The present disclosure contains subject matter related to that disclosed in Japanese Priority Patent Application JP 2010-191082 filed in the Japan Patent Office on Aug. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:

a signal control section for receiving an input signal read-out from an imaging element in either of an interlace scheme or a progressive scheme, and for performing a different process on the input signal according to a read-out scheme to generate an output signal for a signal processing section; and the signal processing section for performing signal processing on the output signal from the signal control section and for generating an output image signal, wherein when the read-out scheme from the imaging element is either the interlace scheme or the progressive scheme, the signal control section performs a control of generating a signal which includes a same color information in either case of the interlace scheme and the progressive scheme to output the output signal to the signal processing section, wherein the signal processing section includes:
a vertical frequency correction signal generating section which receives input signals in parallel from the signal control section, the signals being output from a plurality of adjacent horizontal lines which are output from the imaging element;
a horizontal frequency correction signal generating section which receives an output signal of one horizontal line or an addition signal of adjacent horizontal lines from the signal control section, the output signal being output from the imaging element; and
a color signal generating section which receives output signals of a plurality of adjacent horizontal lines in parallel from the signal control section, the output signals being output from the imaging element.

2. The imaging device according to claim 1, wherein the signal control section includes an adder for adding signals in a pixel unit between adjacent horizontal lines which are read-out signals of the progressive scheme, the signals being read-out signals of the progressive scheme, and
wherein the signal control section generates a mixed signal corresponding to a 2-pixel mixed signal which is a read-out signal of the interlaced scheme by addition processing of the adder.

3. The imaging device according to claim 1, wherein the signal control section includes a plurality of delay circuits which are connected in series to delay a signal output period of one horizontal line from the imaging element, and
wherein the signal control section outputs a plurality of different horizontal line signals, which are output from the imaging element, in parallel to the signal processing section using the delay circuits.

4. The imaging device according to claim 1, wherein the signal control section includes a switch for outputting a different control signal according to whether the read-out scheme from the imaging element is the interlaced scheme or the progressive scheme, and
wherein the signal control section changes settings of the switch based on a control signal of a control section according to the read-out scheme from the imaging element.

5. The imaging device according to claim 1, wherein the signal control section includes:
a plurality of delay circuits which are connected in series to delay a signal output period of one horizontal line from the imaging element;
a first adder which adds an output of one horizontal line from the imaging element to an output of the delay circuit;
a second adder which adds delayed signals having different delay periods generated by the plurality of delay circuits; and
a switch which selects and outputs a signal including at least any one of an undelayed signal output from the imaging element, a delayed signal which passes through only the delay circuit, and an addition signal which passes through at least one of the first and second adders.

6. The imaging device according to claim 5, wherein when the read-out scheme from the imaging element is set to an interlaced read-out scheme in which a 2-pixel mixed signal is read out, the signal control section outputs in parallel:
the undelayed signal from the imaging element;
a first delayed signal which is delayed by one horizontal line output period by the delay circuit; and
a second delayed signal which is delayed by two horizontal line output periods generated via two delay circuits,
to the signal processing section.

7. The imaging device according to claim 5, wherein when the read-out scheme from the imaging element is set to a progressive read-out scheme in which reading-out is performed on a pixel unit, the signal control section outputs in parallel:
a first addition signal which is generated by the first adder, which adds an undelayed signal from the imaging element to a first delayed signal which is delayed by one horizontal line output period by a delay circuit;
a second addition signal which is generated by the second adder, which adds a second delayed signal which is delayed by two horizontal line output periods generated via two delay circuits to a third delayed signal which is delayed by three horizontal line output periods generated via three delay circuits; and
a third addition signal which is generated by a third adder, which adds a fourth delayed signal which is delayed by four horizontal line output periods generated via four delay circuits to a fifth delayed signal which is delayed by five horizontal line output periods generated by five delay circuits,
to the signal processing section.

8. The imaging device according to claim 1, wherein the color signal generating section generates an RGB signal corresponding to each pixel based on an output signal of the imaging element.

9. The imaging device according to claim 1, wherein the imaging element is an imaging element which has four kinds of color filters of G (Green), Mg (Magenta), Ye (Yellow), and Cy (Cyan).

10. A signal processing method which is performed in an imaging device, the method comprising:
causing a signal control section to receive an input signal read-out from an imaging element in either of an interlace scheme or a progressive scheme, and to perform a different process on the input signal according to a read-out scheme to generate an output signal for a signal processing section; and
causing the signal processing section to perform signal processing on the output signal from the signal control section and to generate an output image signal,
wherein in causing of the signal control section to receive the input signal and generate the output signal, when the read-out scheme from the imaging element is either the interlace scheme or the progressive scheme, the signal control section performs control of generating a signal which includes a same color information in either case of the interlace scheme and the progressive scheme to output the output signal to the signal processing section,
wherein the signal processing section includes:
a vertical frequency correction signal generating section which receives input signals in parallel from the signal control section, the signals being output from a plurality of adjacent horizontal lines which are output from the imaging element;
a horizontal frequency correction signal generating section which receives an output signal of one horizontal line or an addition signal of adjacent horizontal lines from the signal control section, the output signal being output from the imaging element; and
a color signal generating section which receives output signals of a plurality of adjacent horizontal lines in parallel from the signal control section, the output signals being output from the imaging element.

11. A program embodied on a non-transitory computer readable medium for performing signal processing in an imaging device, the program comprising:

causing a signal control section to receive an input signal read-out from an imaging element in either of an interlace scheme or a progressive scheme, and to perform a different process on the input signal according to a read-out scheme to generate an output signal for a signal processing section; and causing the signal processing section to perform signal processing on the output signal from the signal control section and to generate an output image signal, wherein in causing the signal control section to receive and generate a signal, when the read-out scheme from the imaging element is either the interlace scheme or the progressive scheme, the signal control section performs a control of generating a signal which includes a same color information in either case of the interlace scheme and the progressive scheme to output the output signal to the signal processing section, wherein the signal processing section includes:

a vertical frequency correction signal generating section which receives input signals in parallel from the signal control section, the signals being output from a plurality of adjacent horizontal lines which are output from the imaging element;

a horizontal frequency correction signal generating section which receives an output signal of one horizontal line or an addition signal of adjacent horizontal lines from the signal control section the output signal being output from the imaging element; and a color signal generating section which receives output signals of a plurality of adjacent horizontal lines in parallel from the signal control section, the output signals being output from the imaging element.

* * * * *